US012723870B2

(12) United States Patent
Hashimura et al.

(10) Patent No.: US 12,723,870 B2
(45) Date of Patent: Sep. 1, 2026

(54) SHAPE MEASUREMENT DEVICE AND SHAPE MEASUREMENT METHOD

(71) Applicant: KEISOKUGIKEN CO., LTD., Amagasaki (JP)

(72) Inventors: Yoshito Hashimura, Amagasaki-shi (JM); Shyoji Fujiwara, Amagasaki (JP); Nobuki Fujiwara, Amagasaki (JP)

( * ) Notice: Subject to any disclaimer, the term of this patent is extended or adjusted under 35 U.S.C. 154(b) by 19 days.

(21) Appl. No.: 18/872,823

(22) PCT Filed: Jun. 28, 2023

(86) PCT No.: PCT/JP2023/024038
§ 371 (c)(1),
(2) Date: Apr. 18, 2025

(87) PCT Pub. No.: WO2024/005098
PCT Pub. Date: Jan. 4, 2024

(65) Prior Publication Data

US 2025/0389531 A1 Dec. 25, 2025

(30) Foreign Application Priority Data

Jul. 1, 2022 (JP) ................................ 2022-107394

(51) Int. Cl.
*G01B 11/24* (2006.01)
*G01C 7/06* (2006.01)

(52) U.S. Cl.
CPC ................ *G01B 11/24* (2013.01); *G01C 7/06* (2013.01)

(58) Field of Classification Search
CPC ........... G01B 11/24; G01C 7/06; G01C 15/00
See application file for complete search history.

(56) References Cited

U.S. PATENT DOCUMENTS

2011/0019176 A1* 1/2011 Kim ...................... G01S 7/4817 356/5.01
2018/0054610 A1* 2/2018 Shpunt .................... G01S 17/42
2020/0149885 A1* 5/2020 Kamei ................. G01B 11/245

FOREIGN PATENT DOCUMENTS

JP 2001-255144 A 9/2001
JP 2002-081935 A 3/2002
(Continued)

OTHER PUBLICATIONS

PCT ISR of PCT/JP2023/024038 published on Jan. 4, 2024.
PCT Written Opinion of PCT/JP2023/024038 published on Jan. 4, 2024.

*Primary Examiner* — Tarifur R Chowdhury
*Assistant Examiner* — Akbar H. Rizvi

(57) ABSTRACT

A first point measurement control part rotates a cylinder part of a cylindrical rotation part to a predetermined reference cylindrical angle, makes the laser beam irradiate, and measures a position of a predetermined first point in a hollow from a reflection point of the laser beam on the mirror. A first rotation control part rotates the cylinder part from the reference cylindrical angle to 180 degrees. A second rotation control part rotates the columnar part from the reference mirror angle to 180 degrees. A second point measurement control part makes the laser beam irradiate after the cylinder part is rotated by 180 degrees, and measures a position of a predetermined second point in the hollow from the reflection point of the laser beam on the mirror. A correction control part corrects a rotation operation of the cylinder part and a rotation operation of the columnar part.

20 Claims, 29 Drawing Sheets

(56) References Cited

FOREIGN PATENT DOCUMENTS

| | | |
|---|---|---|
| JP | 2015-042974 A | 3/2015 |
| JP | 2018-021327 A | 2/2018 |

* cited by examiner

Front perspective view

Tunnel side

| Measurement point name | No.1 | No.2 | No.3 | No.4 | No.5 | No.6 | No.7 | No.8 | No.9 | No.10 | No.11 | No.12 | No.13 |
|---|---|---|---|---|---|---|---|---|---|---|---|---|---|
| The largest value | 2984.96 | 2652.82 | 2455.10 | 2345.86 | 2310.86 | 2342.82 | 2448.24 | 2644.86 | 2970.18 | 2751.88 | 2446.76 | 2263.86 | 2164.72 |
| The smallest value | 2984.44 | 2652.26 | 2454.24 | 2345.34 | 2310.56 | 2342.44 | 2447.60 | 2643.92 | 2969.34 | 2751.46 | 2446.22 | 2263.32 | 2164.46 |
| Difference | 0.52 | 0.56 | 0.86 | 0.52 | 0.30 | 0.38 | 0.64 | 0.94 | 0.84 | 0.42 | 0.54 | 0.54 | 0.26 |
| Average value of 10 measurements | 2984.70 | 2652.60 | 2454.62 | 2345.61 | 2310.73 | 2342.59 | 2447.87 | 2644.38 | 2969.72 | 2751.68 | 2446.46 | 2263.55 | 2164.58 |

| Measurement point name | No.14 | No.15 | No.16 | No.17 | No.18 | No.19 | No.20 | No.21 | No.22 | No.23 | No.24 | No.25 | No.26 |
|---|---|---|---|---|---|---|---|---|---|---|---|---|---|
| The largest value | 2133.06 | 2162.70 | 2441.38 | 2742.94 | 2622.56 | 2332.80 | 2159.40 | 2064.74 | 2033.80 | 2062.94 | 2329.32 | 2617.56 | 2576.64 |
| The smallest value | 2132.54 | 2162.30 | 2440.40 | 2742.38 | 2621.42 | 2332.30 | 2158.92 | 2064.34 | 2033.36 | 2062.62 | 2328.88 | 2616.52 | 2575.68 |
| Difference | 0.52 | 0.40 | 0.98 | 0.56 | 1.14 | 0.50 | 0.48 | 0.40 | 0.44 | 0.32 | 0.44 | 1.04 | 0.96 |
| Average value of 10 measurements | 2132.80 | 2162.48 | 2440.76 | 2742.57 | 2622.08 | 2332.57 | 2159.12 | 2064.59 | 2033.60 | 2062.77 | 2329.07 | 2617.02 | 2576.28 |

Fig. 13A

| Measurement point name | No.27 | No.28 | No.29 | No.30 | No.31 | No.32 | No.33 | No.34 | No.35 | No.36 | No.37 | No.38 | No.39 |
|---|---|---|---|---|---|---|---|---|---|---|---|---|---|
| The largest value | 2292.96 | 2122.18 | 2028.86 | 2000.12 | 2028.14 | 2290.20 | 2572.68 | 2607.88 | 2320.48 | 2147.16 | 2052.90 | 2023.00 | 2051.98 |
| The smallest value | 2292.66 | 2121.70 | 2028.38 | 1999.54 | 2027.58 | 2289.78 | 2571.90 | 2606.82 | 2320.00 | 2146.62 | 2052.40 | 2022.32 | 2051.44 |
| Difference | 0.30 | 0.48 | 0.48 | 0.58 | 0.56 | 0.42 | 0.78 | 1.06 | 0.48 | 0.54 | 0.50 | 0.68 | 0.54 |
| Average value of 10 measurements | 2292.78 | 2121.92 | 2028.64 | 1999.84 | 2027.87 | 2290.01 | 2572.27 | 2607.45 | 2320.27 | 2146.94 | 2052.70 | 2022.67 | 2051.65 |

| Measurement point name | No.40 | No.41 | No.42 | No.43 | No.44 | No.45 | No.46 | No.47 | No.48 | No.49 | No.50 | No.51 | No.52 |
|---|---|---|---|---|---|---|---|---|---|---|---|---|---|
| The largest value | 2318.04 | 2603.38 | 2718.66 | 2419.08 | 2237.58 | 2139.44 | 2108.08 | 2138.86 | 2417.30 | 2713.68 | 2928.58 | 2604.56 | 2302.76 |
| The smallest value | 2317.60 | 2602.50 | 2717.36 | 2418.60 | 2236.86 | 2138.56 | 2107.76 | 2138.24 | 2416.50 | 2713.06 | 2927.96 | 2603.28 | 2302.08 |
| Difference | 0.44 | 0.88 | 1.30 | 0.48 | 0.72 | 0.88 | 0.32 | 0.62 | 0.80 | 0.62 | 0.62 | 1.28 | 0.68 |
| Average value of 10 measurements | 2317.78 | 2602.98 | 2718.26 | 2418.84 | 2237.25 | 2139.05 | 2107.90 | 2138.65 | 2416.94 | 2713.42 | 2928.27 | 2603.85 | 2302.51 |

Fig. 13B

| Measurement point name | No.53 | No.54 | No.55 | No.56 | No.57 | No.58 | No.59 | No.60 | No.61 | No.62 | No.63 |
|---|---|---|---|---|---|---|---|---|---|---|---|
| The largest value | 2268.74 | 2303.28 | 2603.60 | 2922.88 | 2915.64 | 2697.10 | 2577.86 | 2540.62 | 2579.84 | 2912.76 | 3271.02 |
| The smallest value | 2268.14 | 2302.92 | 2602.40 | 2921.74 | 2914.44 | 2696.48 | 2576.64 | 2539.56 | 2578.58 | 2911.94 | 3270.08 |
| Difference | 0.60 | 0.36 | 1.20 | 1.14 | 1.20 | 0.62 | 1.22 | 1.06 | 1.26 | 0.82 | 0.94 |
| Average value of 10 measurements | 2268.51 | 2303.14 | 2602.85 | 2922.38 | 2914.96 | 2696.80 | 2577.42 | 2540.23 | 2579.22 | 2912.49 | 3270.60 |

Fig. 13C

| | Comparative Example | | | Example | | | Difference | | |
|---|---|---|---|---|---|---|---|---|---|
| Measurement point | X | Y | Z | X | Y | Z | X | Y | Z |
| No.1 | 205.0 | 1682.0 | 1718.0 | 207.2 | 1681.4 | 1716.2 | -2.2 | 0.6 | 1.8 |
| No.2 | 211.0 | 1110.0 | 1718.0 | 212.3 | 1109.0 | 1715.8 | -1.3 | 1.0 | 2.2 |
| No.3 | 215.0 | 644.0 | 1719.0 | 215.6 | 643.1 | 1716.9 | -0.6 | 0.9 | 2.1 |
| No.4 | 218.0 | 233.0 | 1719.0 | 219.4 | 233.4 | 1716.2 | -1.4 | -0.4 | 2.8 |
| No.5 | 222.0 | -150.0 | 1720.0 | 222.5 | -150.8 | 1716.5 | -0.5 | 0.8 | 3.5 |
| No.6 | 226.0 | -535.0 | 1720.0 | 225.6 | -534.4 | 1716.7 | 0.4 | -0.6 | 3.3 |
| No.7 | 228.0 | -944.0 | 1721.0 | 228.7 | -942.3 | 1717.3 | -0.7 | -1.7 | 3.7 |
| No.8 | 231.0 | -1407.0 | 1723.0 | 231.6 | -1406.3 | 1719.0 | -0.6 | -0.7 | 4.0 |
| No.9 | 235.0 | -1975.0 | 1724.0 | 235.8 | -1974.3 | 1719.9 | -0.8 | -0.7 | 4.1 |
| No.14 | 626.0 | -149.0 | 1717.0 | 627.1 | -148.3 | 1716.2 | -1.1 | -0.7 | 0.8 |

Fig. 15A

| | Comparative Example | | | Example | | | Difference | | |
|---|---|---|---|---|---|---|---|---|---|
| Measurement point | X | Y | Z | X | Y | Z | X | Y | Z |
| No.22 | 980.0 | -146.0 | 1716.0 | 981.0 | -146.1 | 1714.6 | -1.0 | 0.1 | 1.4 |
| No.26 | 1299.0 | 1426.0 | 1716.0 | 1301.0 | 1426.6 | 1714.6 | -2.0 | -0.6 | 1.4 |
| No.27 | 1302.0 | 935.0 | 1716.0 | 1304.1 | 935.5 | 1714.3 | -2.1 | -0.5 | 1.7 |
| No.28 | 1305.0 | 536.0 | 1715.0 | 1306.7 | 536.1 | 1714.7 | -1.7 | -0.1 | 0.3 |
| No.29 | 1308.0 | 185.0 | 1715.0 | 1308.9 | 183.8 | 1714.0 | -0.9 | 1.2 | 1.0 |
| No.30 | 1311.0 | -144.0 | 1715.0 | 1311.0 | -144.0 | 1715.1 | 0.0 | 0.0 | -0.1 |
| No.31 | 1313.0 | -173.0 | 1717.0 | 1313.1 | -173.0 | 1715.7 | -0.1 | 0.0 | 1.3 |
| No.32 | 1318.0 | -1223.0 | 1721.0 | 1317.8 | -1222.2 | 1720.8 | 0.2 | -0.8 | 0.2 |
| No.33 | 1320.0 | -1712.0 | 1724.0 | 1320.9 | -1711.5 | 1722.6 | -0.9 | -0.5 | 1.4 |
| No.38 | 1638.0 | -142.0 | 1715.0 | 1639.1 | -141.9 | 1714.6 | -1.1 | -0.1 | 0.4 |

Fig. 15B

| | Comparative Example | | | Example | | | Difference | | |
|---|---|---|---|---|---|---|---|---|---|
| Measurement point | X | Y | Z | X | Y | Z | X | Y | Z |
| No.46 | 1985.0 | -141.0 | 1715.0 | 1986.5 | -139.7 | 1715.6 | -1.5 | -1.3 | -0.6 |
| No.53 | 2376.0 | -138.0 | 1716.0 | 2378.5 | -137.1 | 1715.3 | -2.5 | -0.9 | 0.7 |
| No.57 | 2847.0 | 1253.0 | 1717.0 | 2850.1 | 1256.5 | 1714.3 | -3.1 | -3.5 | 2.7 |
| No.58 | 2853.0 | 742.0 | 1718.0 | 2853.4 | 742.6 | 1716.0 | -0.4 | -0.6 | 2.0 |
| No.59 | 2854.0 | 290.0 | 1717.0 | 2855.2 | 290.3 | 1716.2 | -1.2 | -0.3 | 0.8 |
| No.60 | 2856.0 | -134.0 | 1718.0 | 2857.7 | -134.0 | 1717.5 | -1.7 | 0.0 | 0.5 |
| No.61 | 2860.0 | -559.0 | 1722.0 | 2861.6 | -558.5 | 1720.4 | -1.6 | -0.5 | 1.6 |
| No.62 | 2866.0 | -1524.0 | 1723.0 | 2866.8 | -1523.1 | 1722.8 | -0.8 | -0.9 | 0.2 |
| No.63 | 2866.0 | -2151.0 | 1723.0 | 2868.7 | -2150.0 | 1722.4 | -2.7 | -1.0 | 0.6 |

Fig. 15C

SHAPE MEASUREMENT DEVICE AND SHAPE MEASUREMENT METHOD

CROSS-REFERENCE TO RELATED APPLICATION

This application is the National Stage of International Application No. PCT/JP2023/024038 filed on Jun. 28, 2023, which claims priority to Japanese Application No. 2022-107394 filed on Jul. 1, 2022, the entire contents of which are herein incorporated by reference in entirety.

TECHNICAL FIELD

The present invention relates to a shape measurement device and a shape measurement method.

BACKGROUND ART

Conventionally, there are many techniques for measuring a hollow cross-sectional shape such as a tunnel, a large underground cavity, a building, and a large cylindrical pipe. Here, a laser range finder is used to measure the hollow cross-sectional shape. The laser range finder is a measuring device that irradiates a laser beam to an object (target), converts a time from starting a starting point (transmission source) of the laser beam, and reflecting at an irradiation point (measurement point) of the object, to returning to the starting point into a distance, and measures a distance from the starting point of the laser beam to the irradiation point of the object.

For example, JP-A-2001-255144 (PTL1) discloses a measurement device that is installed in a tunnel in order to measure a hollow cross-sectional shape of the tunnel. The device includes an optical distance measuring means, a light projecting direction varying means, a rotational displacement detecting means, a turning means, a turning displacement detecting means, a distance measuring control means, an operation control means, and a computing means. Also, JP-A-2002-081935 (PTL2) discloses a dimension measuring device for an elevator. The device includes a distance meter, a reflector, a hollow rotation mechanism, and an operation control device. Further, JP-A-2018-021327 (PTL3) discloses a roundness measuring device for measuring a roundness of an inner peripheral surface of segments assembled in a cylindrical wall shape formed by a shield machine. The device includes a distance detection unit, a scanning unit, a rotation angle detection unit, and a roundness calculation unit.

On the other hand, as shown in JP-A-2015-042974 (PTL4), the applicant has filed and patented a hollow cross-sectional shape measurement device for measuring a hollow cross-sectional shape. The hollow cross-sectional shape measurement device includes a laser range finder part, a cylindrical rotation part, a reflection part, a hollow cross-sectional shape calculation part, a first inclination adjustment part, and a second inclination adjustment part.

CITATION LIST

Patent Literature

PTL1: JP-A-2001-255144
PTL2: JP-A-2002-081935
PTL3: JP-A-2018-021327
PTL4: JP-A-2015-042974

SUMMARY OF INVENTION

Technical Problems

Here, in a case where the hollow cross-sectional shape measurement device making a laser beam of a laser range finder rotate in a cylinder part of a cylindrical rotation part installing a mirror is used on site, a calibration work of confirming whether or not the laser beam is correctly rotated 180 degrees is needed. In the calibration work, first, a measurer installs the device at a position near the center of the hollow at the site, and sets two reference points (a first reference point and a second reference point) that are present on a straight line on both sides of the device with the device as the center. Next, the measurer rotates the cylinder part, irradiates the laser beam of the laser range finder to the first reference point, and confirms a rotational operation of the cylinder part. Further, the measurer rotates the cylinder part by 180 degrees, irradiates the laser beam of the laser range finder to the second reference point this time, and confirms whether or not the laser beam is correctly irradiated to the second reference point.

Here, when the laser beam does not irradiate to the second reference point, a measurement accuracy of the device deteriorates. There are three causes why the laser beam does not correctly irradiate to the second reference point. The first cause is that the cylinder part is not correctly rotated by 180 degrees. In this case, since an optical axis of the laser beam does not coincide with a rotation axis of the cylinder part, it is necessary to adjust a position of the cylinder part and a rotation operation of the cylinder part. The second cause is that the second reference point is not correctly set. The third cause is that the device is not properly installed. Since three causes are considered as described above, if the laser beam does not correctly irradiate to the second reference point, the measurer confirms the three causes one by one and performs the calibration work on site.

However, there is a problem that the calibration work takes a lot of time and effort. In addition, it is difficult to correct all the causes, and when the irradiation point of the laser beam is slightly deviated from the second reference point, it is also difficult to clarify the cause of the deviation. Further, for example, when an adjustment position of the cylinder part and an installation position of the device are reversely deviated from each other, the irradiation point of the laser beam may apparently coincide with the second reference point. However, since both the adjustment position and the installation position are deviated from each other, there is a problem that an error occurs in a measurement point at another rotation angle. And unless the calibration work is performed appropriately, since it was not able to proceed to a measurement of a next hollow cross-sectional shape, the measurer would spend half a day or more on the calibration work, and the calibration work was a bottleneck in the measurement of the hollow cross-sectional shape. In addition, when the calibration work is not appropriately performed, there is a problem that a measurement accuracy of the hollow cross-sectional shape deteriorates. In the above description, two directions on both sides with the device as the center are used as calibration spaces; furthermore, other calibration spaces in two orthogonal directions are needed, the calibration spaces in total four directions are needed, and there is a problem that a lot of calibration spaces are needed. The techniques described in PTL 1 to 4 cannot solve such the problems.

Accordingly, the present invention was created as a solution for the problems and aims at providing a shape measurement device and a shape measurement method that can perform a calibration work easily and can measure a shape accurately.

Solution to Problem

A shape measurement device according to the present invention includes a laser range finder part, a cylindrical rotation part, a holding part, a mirror rotation part, a mirror, a first point measurement control part, a first rotation control part, a second rotation control part, a second point measurement control part, and a correction control part. The laser range finder part is fixed to a flat table and is capable of measuring a distance from a starting point of a laser beam to an irradiation point irradiated by the laser beam. The cylindrical rotation part is installed at an end part of the flat table, and makes a rotational axis of a rotatable cylinder part coincide with the laser beam from the laser range finder part. The holding part has a first surface and a second surface, the first surface having a passage hole through which the laser beam passes and fixed to an end part of the cylinder part of a cylindrical rotation part irradiating the laser beam, and the second surface having a cylindrical hole and being provided in a direction perpendicular to the first surface. The mirror rotation part is fixed to the second surface, and rotatably attaches an end part of a columnar part to the cylindrical hole in a state where a rotation axis of the columnar part coincides with the laser beam from the laser range finder part. The mirror is fixed to the end part of the columnar part, disposes a reflection surface on an extension line of the rotation axis of the columnar part, and reflects the laser beam from the laser range finder part. The first point measurement control part rotates the cylinder part to a predetermined reference cylindrical angle, rotates the columnar part to a predetermined reference mirror angle, makes the laser beam irradiate, and measures a position of a predetermined first point in a hollow from a reflection point of the laser beam on the mirror. The first rotation control part rotates the cylinder part from the reference cylindrical angle to 180 degrees. The second rotation control part rotates the columnar part from the reference mirror angle to an inversion angle that is line-symmetric with respect to the laser beam irradiated from the end part of the cylinder part. The second point measurement control part makes the laser beam irradiate after the cylinder part is rotated by 180 degrees, and the columnar part is rotated by the inversion angle and measures a position of a predetermined second point in the hollow from the reflection point of the laser beam on the mirror. The correction control part corrects a rotation operation of the cylinder part from the reference cylindrical angle to 180 degrees and a rotation operation of the columnar part from the reference mirror angle to the inversion angle so that the position of the second point coincides with the position of the first point.

A shape measurement method according to the present invention is a shape measurement method of a shape measurement device including a laser range finder part, a cylindrical rotation part, a holding part, a mirror rotation part, and a mirror, and includes a first point measurement control step, a first rotation control step, a second rotation control step, a second point measurement control step, and a correction control step. Each control step of the shape measurement method corresponds to each control part of the shape measurement device.

Advantageous Effects of the Invention

According to the shape measurement device and the shape measurement method of the present invention, it is possible to perform a calibration work easily and measure a shape accurately.

BRIEF DESCRIPTION OF THE DRAWINGS

FIG. 10B is a perspective view of a tunnel side showing an example when the shape measurement device is applied to a face of a tunnel face.

FIG. 13 is a table showing a result of the confirmation test of the variation in measurement points.

FIG. 15 is a table showing the result of the confirmation test of the accuracy in measurement points.

DESCRIPTION OF EMBODIMENTS

The preferred embodiments of a shape measurement device according to the present invention will be explained below according to the attached drawings; thereby the present invention will be clearly understood. The embodiments below are examples materializing the present invention, and do not limit the technical scope of the present invention.

Figure 1:
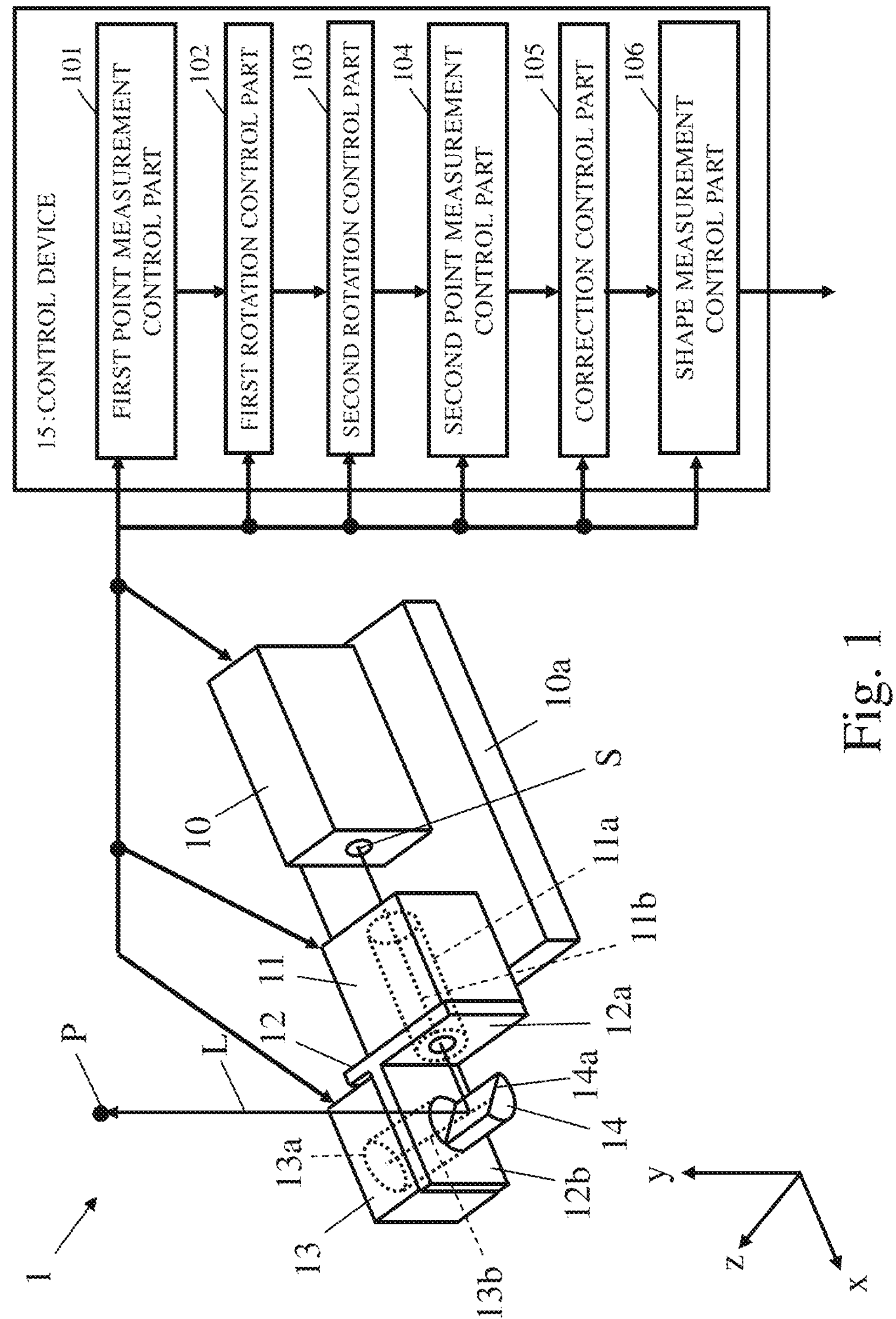
FIG. 1 is a schematic view and a functional block diagram of a shape measurement device according to the present invention.
Figure 2A:
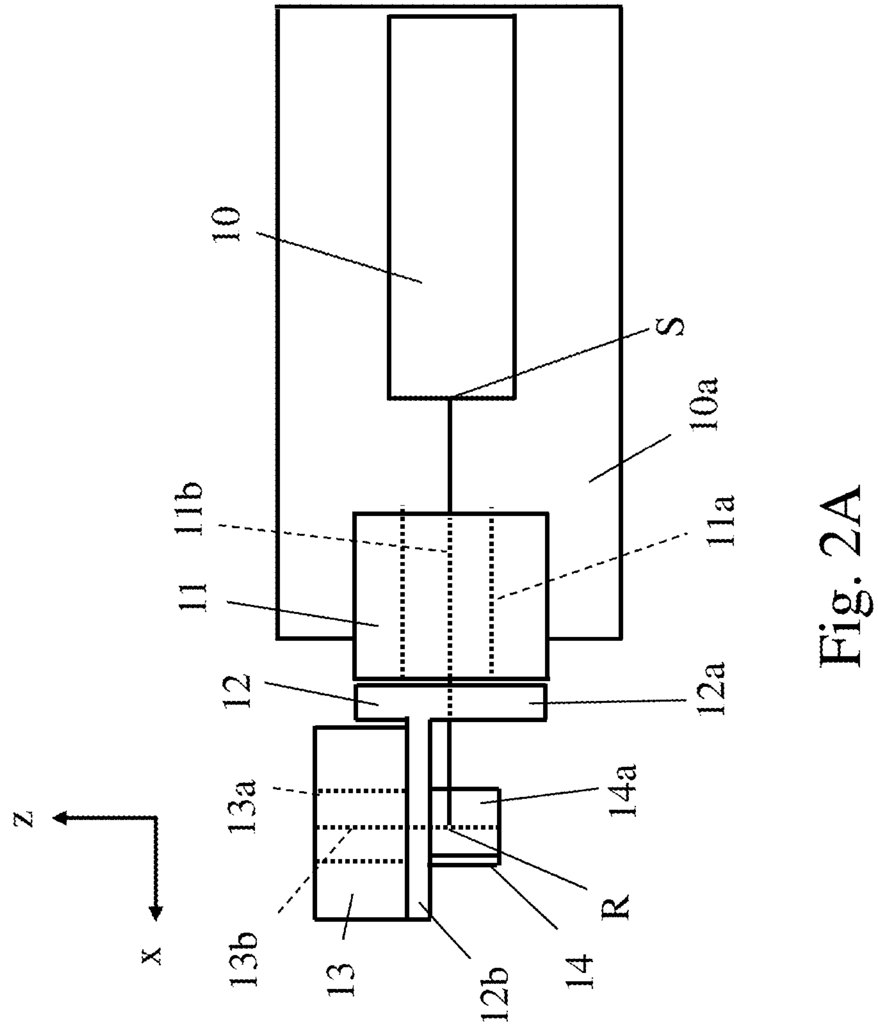
FIG. 2A is a plan view of a shape measurement device according to the present invention.
Figure 2B:
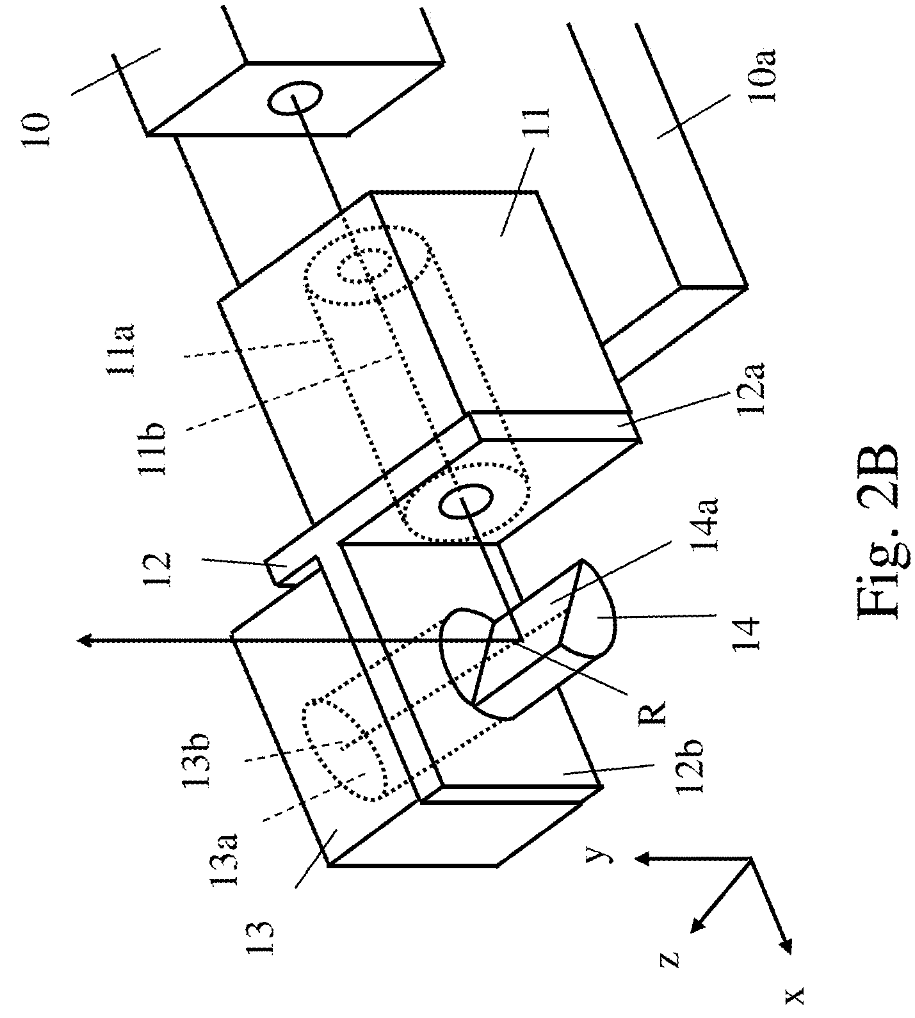
FIG. 2B is a front perspective view of a shape measurement device according to the present invention.
Figure 2C:
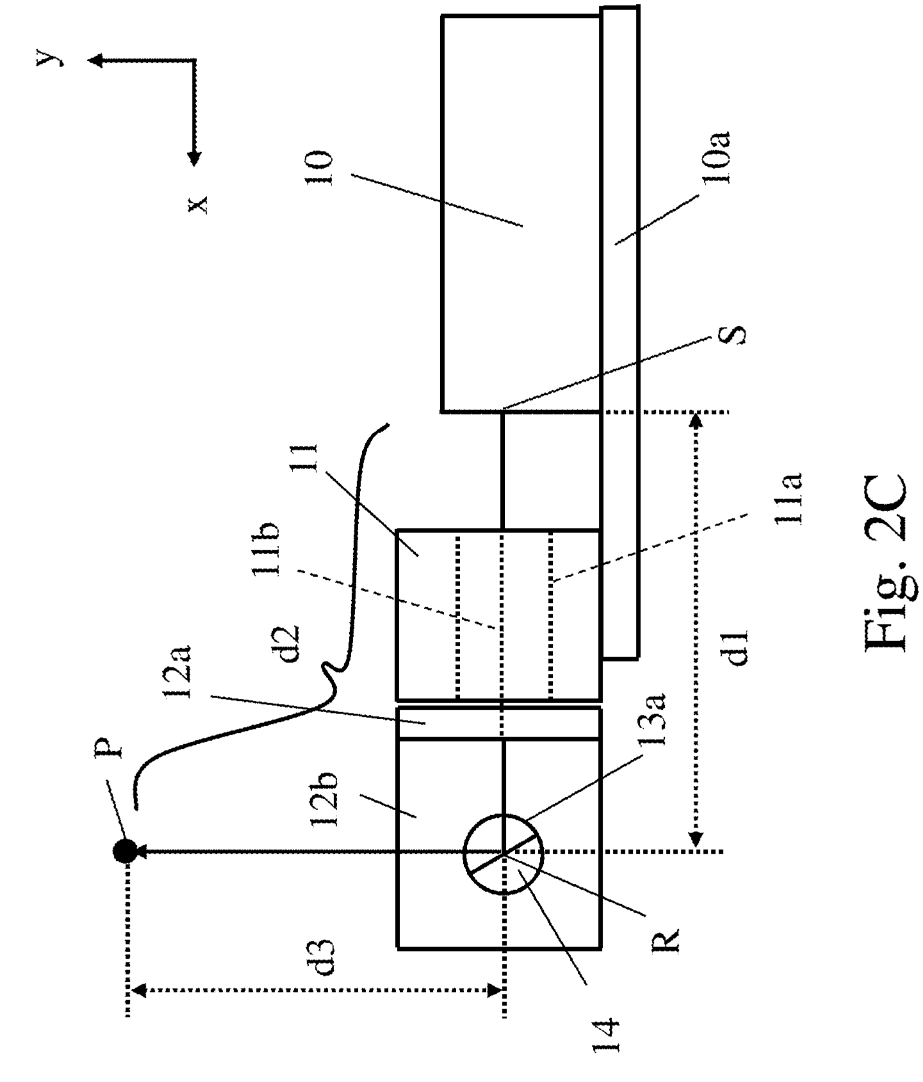
FIG. 2C is a right side view of a shape measurement device according to the present invention.
Figure 2D:
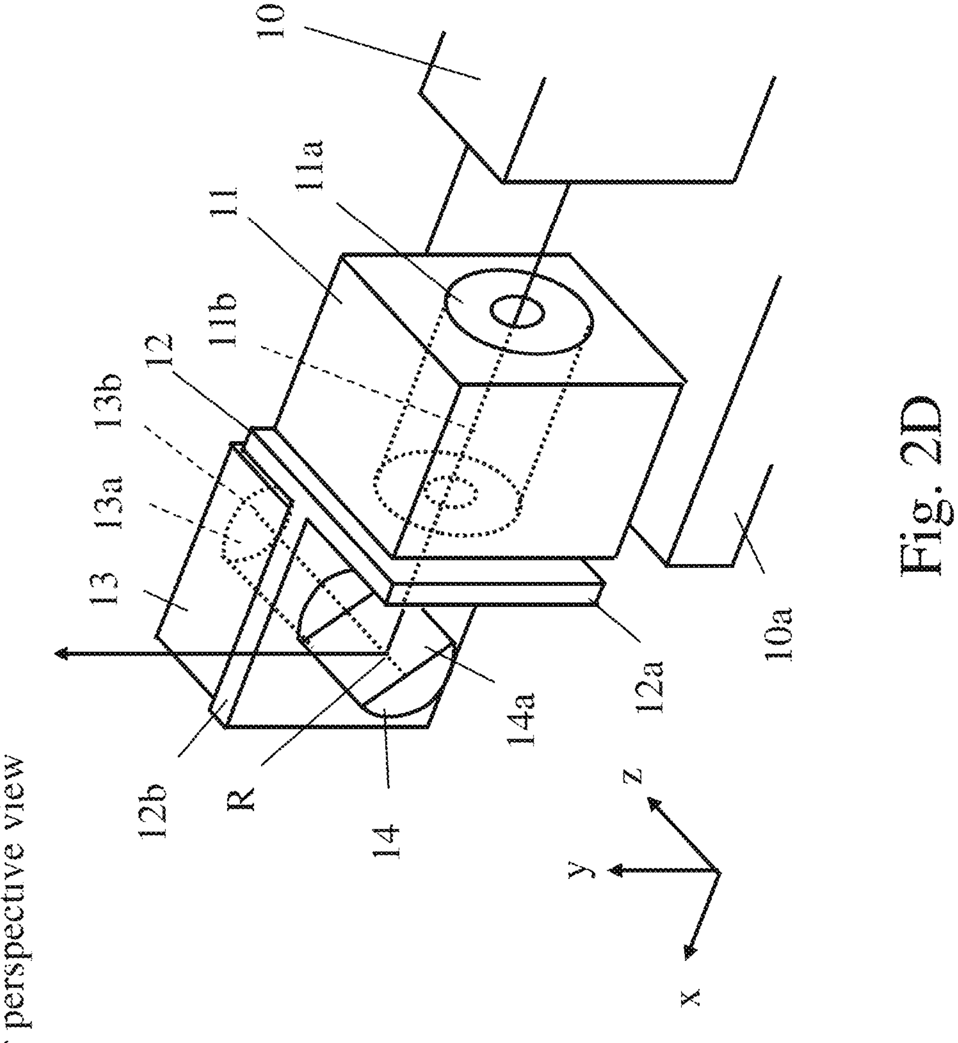
FIG. 2D is a rear perspective view of a shape measurement device according to the present invention.

As shown in FIGS. 1 and 2, a shape measurement device 1 according to the present invention includes a laser range finder part 10, a cylindrical rotation part 11, a holding part 12, a mirror rotation part 13, a mirror 14 (reflection part), and a control device 15.

Here, the laser range finder part 10 is fixed to a flat table 10*a* and is capable of measuring a distance from a starting point S of a laser beam L to an irradiation point P irradiated by the laser beam L. The cylindrical rotation part 11 is installed at an end part of the flat table 10*a*, and makes a rotational axis 11*b* of a rotatable cylinder part 11*a* coincide with the laser beam L (optical axis) from the laser range finder part 10.

The holding part 12 has a first surface 12*a* and a second surface 12*b*. The first surface 12*a* has a passage hole through which the laser beam L passes and is fixed to an end part of a cylinder part 11*a* of a cylindrical rotation part 11 irradiating the laser beam L. The second surface 12*b* has a cylindrical hole and is provided in a direction perpendicular to the first surface 12*a*. Here, the first surface 12*a* and the second surface 12*b* of the holding part 12 are formed in an L shape, and the second surface 12*b* is provided along the laser beam passing from the first surface 12*a*.

Further, the mirror rotation part 13 is fixed to the second surface 12*b* of the holding part 12, and an end part of the columnar part 13*a* is rotatably attached to a cylindrical hole of the second surface 12*b* in a state where a rotation axis 13*b* of the rotatable columnar part 13*a* intersects the laser beam L (optical axis of the laser beam L) from the laser range finder part 10.

The mirror 14 is fixed to the end part of the columnar part 13*a*, disposes a reflection surface 14*a* on an extension line of the rotation axis 13*b* of the columnar part 13*a*, and reflects the laser beam L from the laser range finder part 10.

The control device 15 is connected to each of the laser range finder part 10, the cylindrical rotation part 11, and the mirror rotation part 13, and controls each part. The control device 15 makes the laser range finder part 10 irradiate the laser beam L and measures a distance from the starting point S of the laser beam L to the irradiation point P of the laser beam L. Further, the control device 15 makes the cylinder part 11*a* of the cylindrical rotation part 11 rotate in order to rotate the holding part 12 fixed to the end part of the cylinder part 11*a*. Further, the control device 15 makes the columnar part 13*a* of the mirror rotation part 13 rotate in order to rotate the mirror 14 fixed to the end part of the columnar part 13*a*.

Here, as shown in FIG. 2, a fixed distance d1 from the starting point S of the laser beam L of the laser range finder part 10 to the reflection point R of the mirror 14 is fixed after the device is assembled. So, a radial distance d3 from the reflection point R of the laser beam L to the irradiation point P of the laser beam L can be calculated by subtracting the fixed distance d1 from a measurement distance d2. The measurement distance d2 is a distance from the starting point S of the laser beam L to the irradiation point P of the laser beam L.

The shape measurement device 1 according to the present invention can rotate the laser beam L in two axes by using a rotation operation of the cylinder part 11*a* of the cylindrical rotation part 11 and a rotation operation of the columnar part 13*a* of the mirror rotation part 13.

Figure 3:
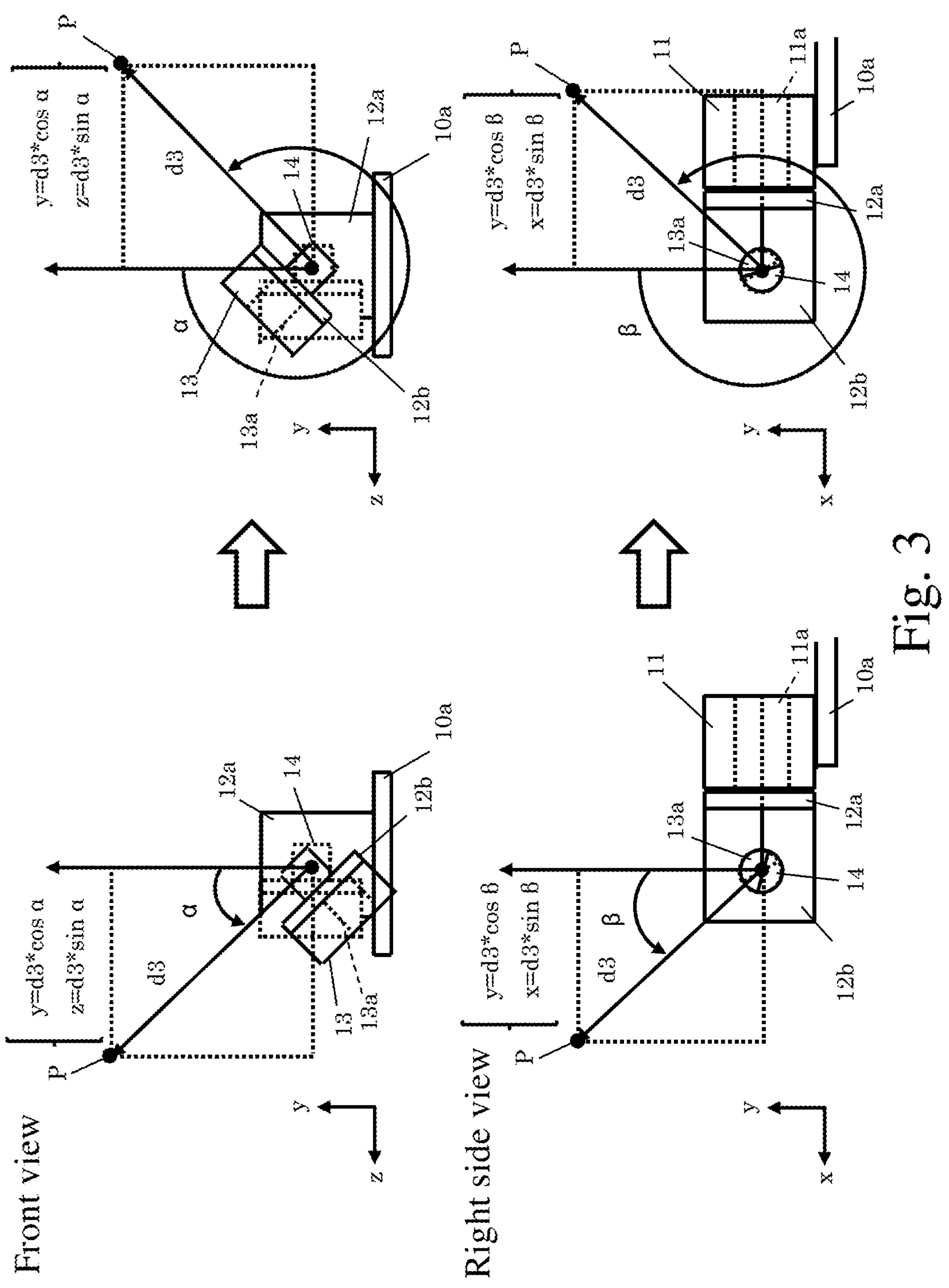
FIG. 3 is a front view and a right side view when a cylinder part and a columnar part of the shape measurement device according to the present invention are rotated.

Here, a relationship between the radial distance d3 and a position of the irradiation point P from the reflection point R will be explained. As shown in FIGS. 1 to 3, a traveling direction of the laser beam L from the starting point S of the laser range finder part 10 is defined as an x-axis direction, an upper direction perpendicular to the traveling direction of the laser beam L is defined as a y-axis direction, and a right direction perpendicular to the traveling direction of the laser beam L is defined as a z-axis direction.

If the y-axis direction is used as a reference, and a rotation angle when the laser beam L rotates from the y-axis direction to the left (counterclockwise) toward the z-axis direction is a first rotation angle α (degrees), a y-coordinate value and a z-coordinate value of the irradiation point P of the laser beam L with respect to the reflection point R of the laser beam L are expressed by the following equations (1) and (2).

$$y = d3 \times \cos\alpha \tag{1}$$

$$z = d3 \times \sin\alpha \tag{2}$$

When the first rotation angle α is 0 degrees, the laser beam L (optical axis) coincides with the y-axis direction, and when the first rotation angle α is 90 degrees, the laser beam L (optical axis) coincides with the z-axis direction.

Further, if a rotation angle when the laser beam L rotates from the y-axis direction to the left (counterclockwise) toward the x-axis direction is a second rotation angle β (degrees), a y-coordinate value and a x-coordinate value of the irradiation point P of the laser beam L with respect to the reflection point R of the laser beam L are expressed by the following equations (3) and (4).

$$y = d3 \times \cos\beta \tag{3}$$

$$x = d3 \times \sin\beta \tag{4}$$

When the second rotation angle β is 0 degrees, the laser beam L (optical axis) coincides with the y-axis direction, and when the second rotation angle β is 90 degrees, the laser beam L (optical axis) coincides with the x-axis direction.

Here, the control device 15 measures the measurement distance d2 from the starting point S of the laser beam L to the irradiation point P of the laser beam L, and calculates the radial distance d3 by subtracting the fixed distance d1 from the measurement distance d2. And, the control device 15 can calculate the position (x-coordinate value, y-coordinate value, z-coordinate value) of the irradiation point P of the laser beam L with respect to the reflection point R of the laser beam L by using the first rotation angle α of the cylinder part 11*a*, the second rotation angle β of the columnar part 13*a*, and equations (1) to (4).

The control device 15 incorporates a CPU, ROM, RAM, HDD, SSD, etc. (not shown), and the CPU uses the RAM as a work area, and executes program stored in the ROM, HDD, SSD, etc. Further, each control part described later also realizes a function of each control part by the CPU executing the program.

Next, as shown in FIGS. 1 to 8, a configuration and execution steps according to an embodiment of the present invention will be explained. First, a measurer carries the shape measurement device 1 and visits a hollow at a site where the measurer wants to measure a hollow cross-sectional shape or a surface shape. Next, as shown in FIG. 5A, the measurer installs the shape measurement device 1 at a position near the center of the hollow 5 at the site, and turns on power of the control device 15 of the shape measurement device 1. Then, the control device 15 is activated and shifts to a measurement preparation of the shape.

Figure 4:
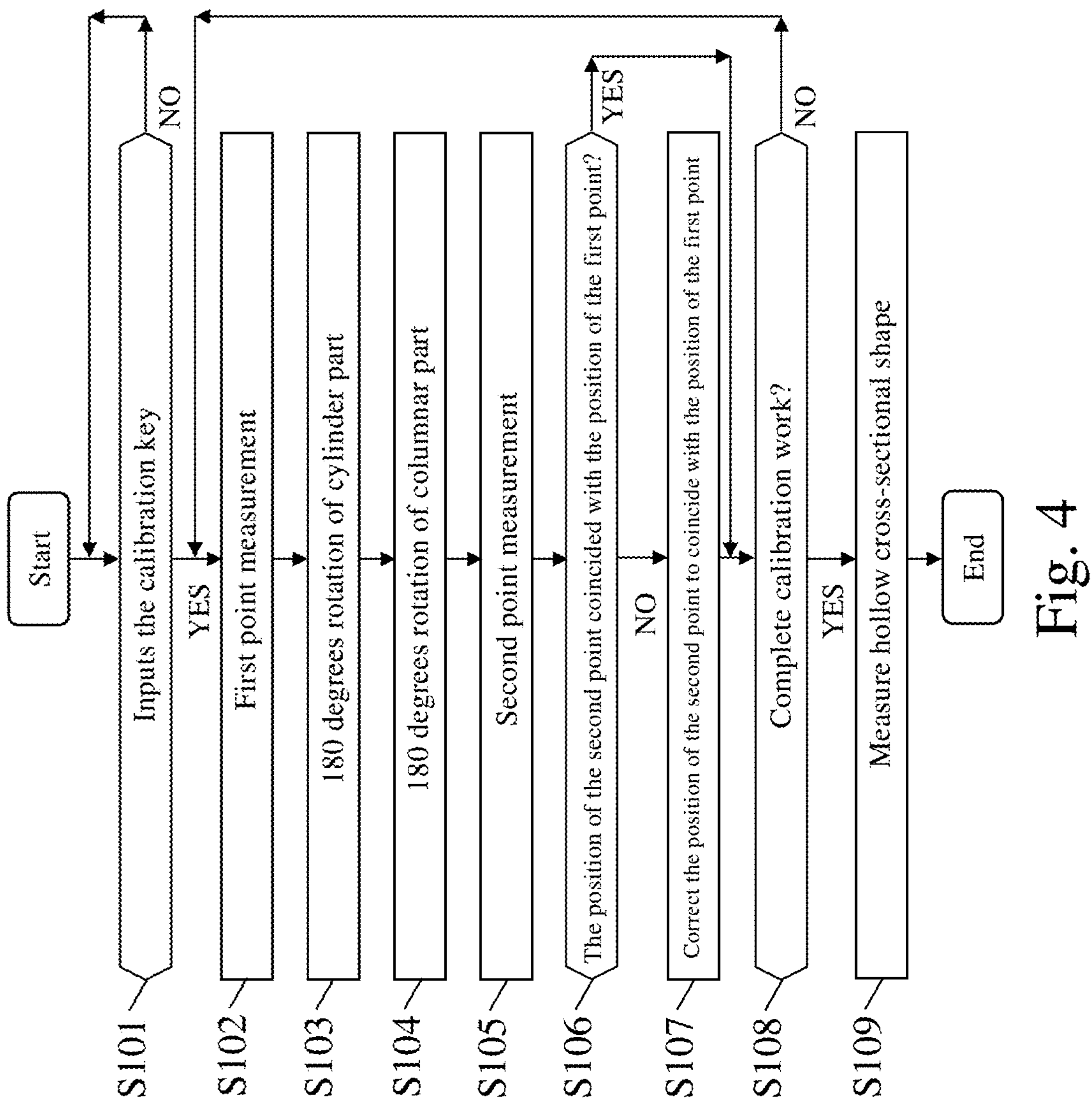
FIG. 4 is a flowchart showing an execution procedure of a shape measurement method according to the present invention.

Here, when the measurer inputs a calibration key to the control device 1 in order to perform a calibration work of the shape measurement device 1 (FIG. 4: S101YES), a first point measurement control part 101 of the control device 15 rotates the cylinder part 11*a* of the cylindrical rotation part 11 to a predetermined reference cylindrical angle α1, rotates the columnar part to a predetermined reference mirror angle β1 makes the laser beam L irradiate, and measures a position of a predetermined first point A in the hollow 5 from a reflection point R of the laser beam L on the mirror 14 (FIG. 4: S102).

Figure 5A:
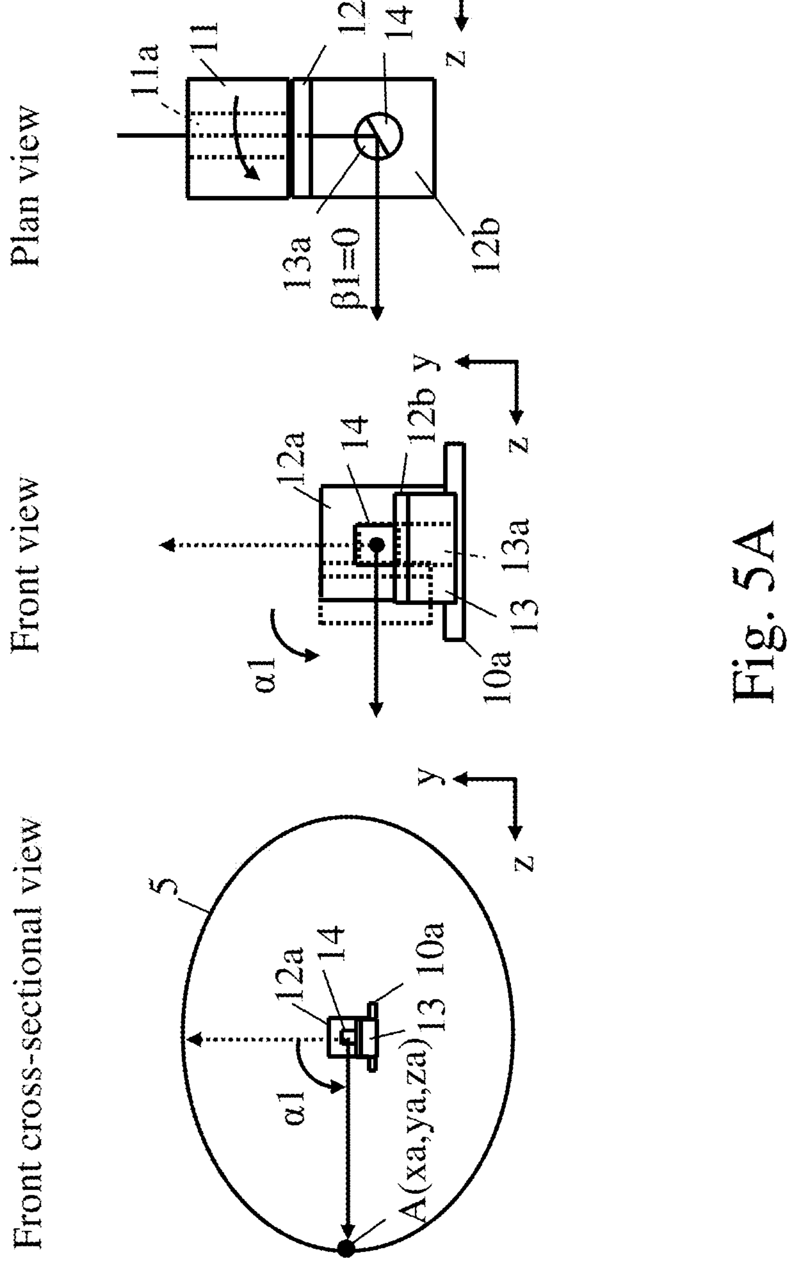
FIG. 5A is a front cross-sectional view, a front view, and a plan view when a position of a first point of a shape measurement device according to the present invention is measured.

Here, the measurement method of the first point measurement control part 101 is not particularly limited. For example, as shown in FIG. 5A, the first point measurement control part 101 rotates the cylinder part 11*a* of the cylindrical rotation part 11 to the predetermined reference cylindrical angle α1 (here, 90 degrees, the laser beam is perpendicular from the y-axis direction to the z-axis direction) and coincides the laser beam L with the y-axis direction. Next, the first point measurement control part 101 rotates the columnar part 13*a* of the mirror rotation part 13 to the predetermined reference mirror angle β1 (here, 0 degrees) and coincides the laser beam L with the z-axis direction. And, the first point measurement control part 101 irradiates the laser beam L from the laser range finder part 10, measures the measurement distance d2, calculates the radial distance d3, and calculates a position (xa, ya, za) of the first point A using the reference cylindrical angle α1, the reference mirror angle β1 and the equations (1) to (4).

When the measurement of the first point measurement control part 101 is completed, next, a first rotation control part 102 of the control device 15 rotates the cylinder part 11*a* of the cylindrical rotation part 11 from the reference cylindrical angle α 1 to 180 degrees (FIG. 4: S103).

Figure 5B:
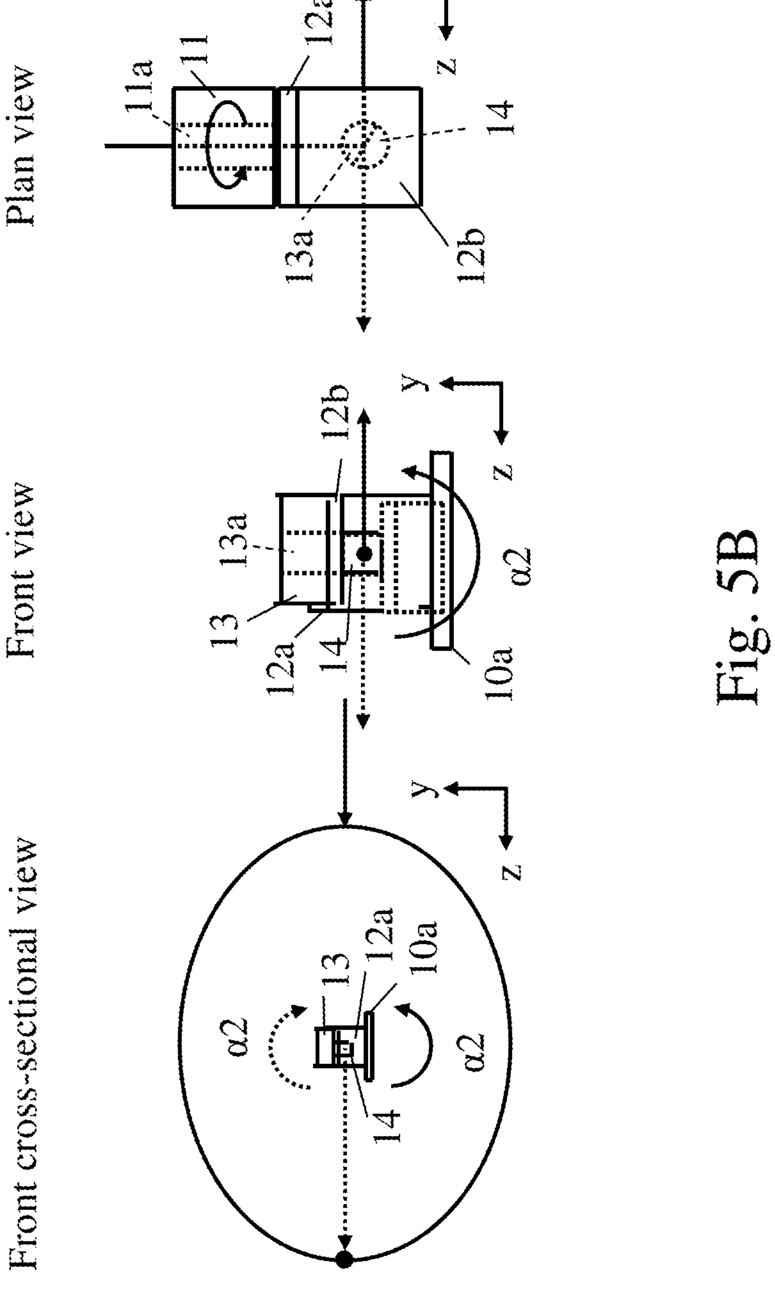
FIG. 5B is a front cross-sectional view, a front view, and a plan view when the cylinder part is rotated by 180 degrees.

Here, the rotation method of the first rotation control part 102 is not particularly limited. For example, as shown in FIG. 5B, the first rotation control part 102 calculates a calibration cylindrical angle α2 obtained by adding 180 degrees to the reference cylindrical angle α1, and rotates the cylinder part 11*a* to the calibration cylindrical angle α2. That is, the first rotation control part 102 rotates the cylinder part 11*a* by 180 degrees. Here, the rotation direction of the cylinder part 11*a* is not particularly limited. As shown in FIG. 5B, the rotation direction may be a counterclockwise direction or a clockwise direction with respect to the z-axis direction.

When the rotation of the first rotation control part 102 is completed, a second rotation control part 103 of the control device 15 rotates the columnar part 13*a* of the mirror rotation part 13 from the reference mirror angle β1 to an inversion angle β2 that is line-symmetric with respect to the laser light L irradiated from the end part of the cylinder part 11*a* (FIG. 4: S104).

Figure 6A:
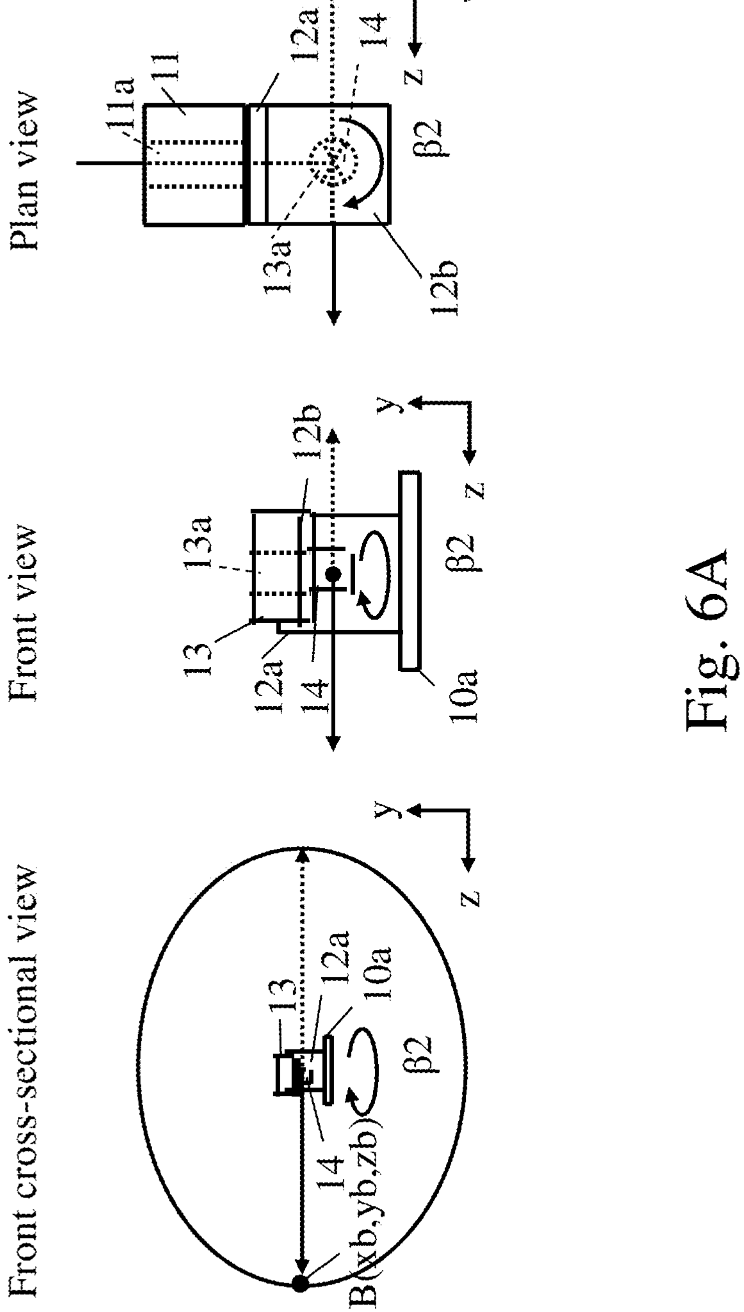
FIG. 6A is a front cross-sectional view, a front view, and a plan view when the columnar part is rotated by 180 degrees.

Here, the rotation method of the second rotation control part 103 is not particularly limited. For example, as shown in FIG. 6A, when the reference mirror angle β1 is 0 degrees, the inversion angle β2 that is line-symmetric with respect to the laser light L irradiated from the end part of the cylinder part 11*a* as a symmetry line is 180 degrees. Therefore, the second rotation control part 103 calculates a calibration mirror angle β2 obtained by adding 180 degrees to the reference mirror angle β1 as an inversion angle, and rotates the columnar part 13*a* to the calibration mirror angle β2 That is, the second rotation control part 103 rotates the columnar part 13*a* by 180 degrees. Here, the inversion angle β2 is not particularly limited as long as the inversion angle β2 is an angle that is line-symmetric with respect to the reference mirror angle β1 with the laser light L irradiated from the end part of the cylinder part 11*a* as a symmetry line. The rotation direction of the columnar part 13*a* is not particularly limited. As shown in FIG. 6A, the rotation direction may be a clockwise direction or a counterclockwise direction with respect to the x-axis direction.

In this way, when the first rotation control part 102 rotates the cylinder part 11*a* by 180 degrees and the second rotation control part 103 rotates the columnar part 13*a* by the inversion angle β2 (here, 180 degrees), the laser beam L returns to the same position as the position of the first point A. In the above description, after the first rotation control part 102 rotates the cylinder part 11*a* (FIG. 4: S103), the second rotation control part 103 rotates the columnar part 13*a* (FIG. 4: S104). In the present invention, since the laser beam L may return to the same position as the first point A, contrary to the above, after the second rotation control part 103 rotates the columnar part 13*a*, the first rotation control part 102 may rotate the cylinder part 11*a*.

When the rotation of the second rotation control part 103 is completed, next, a second point measurement control part 104 of the control device 15 makes the laser beam L irradiate after the cylinder part 11*a* is rotated by 180 degrees, and the columnar part 13*a* is rotated by the inversion angle β2 (here, 180 degrees) and measures a position of a predetermined second point B in the hollow 5 from the reflection point R of the laser beam L on the mirror 14 (FIG. 4: S105).

Here, the measurement method of the second point measurement control part 104 is not particularly limited. For example, as shown in FIG. 6A, the second point measurement control part 104 irradiates the laser beam L from the laser range finder part 10, measures the measurement distance d2, calculates the radial distance d3, and calculates a position (xb, yb, zb) of the second point B using the calibration cylindrical angle α2, the calibration mirror angle β2 (reversal angle) and the equations (1)-(4).

When the measurement by the second point measurement control part 104 is completed, next, a correction control part 105 of the control device 15 corrects a rotation operation of the cylinder part 11*a* from the reference cylindrical angle α1 to the calibration cylindrical angle α2 (in this case, 180 degrees) and a rotation operation of the columnar part 13*a* from the reference mirror angle β1 to the inversion angle β2

(calibration mirror angle) (in this case, 180 degrees) so that the position of the second point B coincides with the position of the first point A.

Here, the correction method of the correction control part 105 is not particularly limited. For example, the correction control part 105 determines whether or not the position (xb, yb, zb) of the second point B coincides with the position (xa, ya, za) of the first point A (FIG. 4: S106).

Figure 6B:
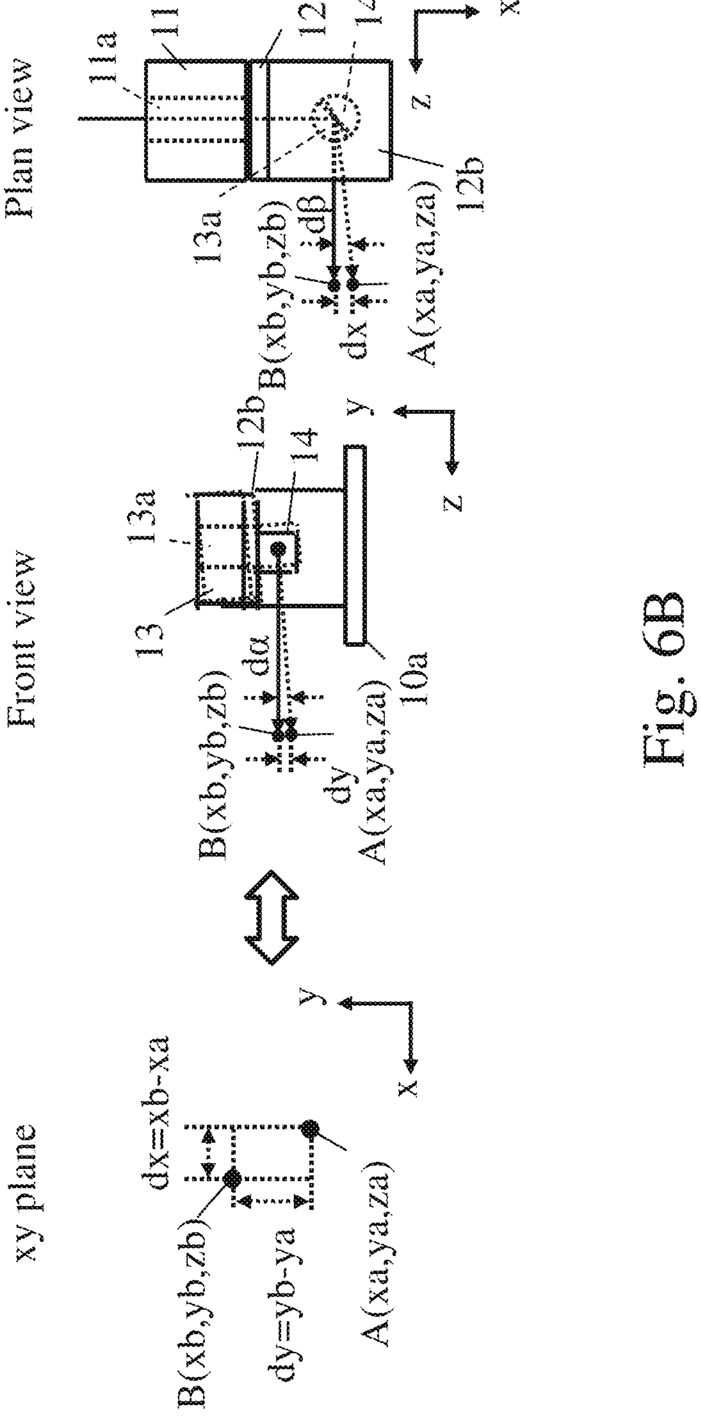
FIG. 6B is a xy plane, a front view, and a plan view in a difference between the position of the first point and a position of a second point.

Here, the determination method of the correction control part 105 is not particularly limited. For example, as shown in FIG. 6B, the position (xb, yb, zb) of the second point B and the position (xa, ya, za) of the first point A are arranged on an xy plane formed by the x-axis direction and the y-axis direction. That is, the difference between the position (xb, yb, zb) of the second point B and the position (xa, ya, za) of the first point A comprises the difference in the rotation direction (here, the y-axis direction) of the cylinder part 11*a* and the difference in the rotation direction (here, the x-axis direction) of the columnar part 13*a*. Therefore, the correction control part 105 calculates a difference (dx=xb−xa) in the x-axis direction and a difference (dy=yb−ya) in the y-axis direction between the position (xb, yb, zb) of the second point B and the position (xa, ya, za) of the first point A. Then, the correction control part 105 determines whether or not the difference dy in the y-axis direction is within a predetermined y-axis direction threshold dy0 and the difference dx in the x-axis direction is within a predetermined x-axis direction threshold dx0.

As a result of the determination, when the difference dy in the y-axis direction is within the y-axis direction threshold dy0 and the difference dx in the x-axis direction is within the x-axis direction threshold dx0, the correction control part 105 determines that the position (xb, yb, zb) of the second point B coincides with the position (xa, ya, za) of the first point A (FIG. 4: S106YES), and does not particularly execute a correction process.

On the other hand, as a result of the determination, when the difference dy in the y-axis direction is over the y-axis direction threshold dy0 or when the difference dx in the x-axis direction is over the x-axis direction threshold dx0, the correction control part 105 determines that the position of the second point B (xb, yb, zb) does not coincide with the position of the first point A (xa, ya, za) (FIG. 4: S106 NO), and corrects the rotation operation of the cylinder part 11*a* or the rotation operation of the columnar part 13*a* so that the position (xb, yb, zb) of the second point B coincides with the position (xa, ya, za) of the first point A (FIG. 4: S107).

Here, the correction method of the correction control part 105 is not particularly limited. For example, when the difference dy in the y-axis direction is over the y-axis direction threshold dy0, even if the cylinder part 11*a* rotates 180 degrees, because the cylinder part 11*a* does not rotate 180 degrees, the difference dy in the y-axis direction occurs. Therefore, the correction control part 105 calculates an angle difference dα in the y-axis direction by the following equation (5) by using the radial distance d3 from the reflection point R of the laser beam L on the mirror 14 to the irradiation point P of the laser beam L in the measurement of the position of the first point A (or the second point B) and the difference dy in the y-axis direction.

$$d\alpha = \tan^{-1}(dy/d3) \tag{5}$$

Then, the correction control part 105 calculates a correction value ay of the rotation operation Y of the cylinder part 11*a* by using the angle difference dα by the following equation (6).

$$ay = (180 - d\alpha)/180 \tag{6}$$

The correction value ay is a division value obtained by dividing a subtraction value by 180 degrees, the subtraction value obtained by subtracting the angle difference dα from 180 degrees. The correction control part 105 can correct the rotation operation Y of the cylinder part 11*a* by multiplying the rotation operation Y of the cylinder part 11*a* by the correction value ay. In this way, when the cylinder part 11*a* rotates by 180 degrees, it is possible to correctly rotate the cylinder part 11*a* by 180 degrees using the corrected value ay. The above angle is based on degrees (degree method), the angle may be based on radians (curvature method). The same applies hereinafter.

When the difference dx in the x-axis direction is over the x-axis direction threshold dx0, even if the columnar part 13*a* rotates by the reversal angle β2 (180 degrees in this case), because the columnar part 13*a* does not rotate 180 degrees, the difference dx in the x-axis direction occurs. Therefore, the correction control part 105 calculates an angle difference dB in the x-axis direction by the following equation (7) by using the radial distance d3 from the reflection point R of the laser beam L on the mirror 14 to the irradiation point P of the laser beam L in the measurement of the position of the first point A (or the second point B) and the difference dx in the x-axis direction.

$$d\beta = \tan^{-1}(dx/d3) \tag{7}$$

Then, the correction control part 105 calculates a correction value ax for the rotation operation X of the columnar part 13*a* by using the reference mirror angle β1 and the inversion angle β2 and the angle difference dβ by the following equation (8).

$$ax = (\beta 2 - \beta 1 - d\beta)/(\beta 2 - \beta 1) \tag{8}$$

The correction value ax is a division value obtained by dividing a first subtraction value from a second subtraction value, the first subtraction value obtained by subtracting the reference mirror angle β1 from the inversion angle β2 and the second subtraction value obtained by subtracting the angle difference dβ from the first subtraction value.

Here, when the reference mirror angle β1 is 0 degrees and the inversion angle $2 is 180 degrees, the correction control part 105 calculates a correction value ax of the rotation operation X of the columnar part 13*a* by using the angle difference dβ by the following equation (9).

$$ax = (180 - d\beta)/180 \tag{9}$$

In this case, the correction value ax is a division value obtained by dividing a subtraction value from 180 degrees, the subtraction value obtained by subtracting the angle difference d β from 180 degrees. The correction control part 105 can correct the rotation operation X of the columnar part 13*a* by multiplying the rotation operation X of the columnar part 13*a* by the correction value ax. In this way, when the columnar part 13*a* rotates by 180 degrees, it is possible to correctly rotate the columnar part 13*a* by 180 degrees using the correction values ax.

When the correction process is not executed (FIG. 4: S106YES) or when the correction control part 105 completes the correction (FIG. 4: S107), the correction control part 105 of the control device 15 inquires of the measurer whether or not the calibration is completed (FIG. 4: S108).

Here, the inquiry method of the correction control part 105 is not particularly limited. For example, the correction control part 105 displays the position (xa, ya, za) of the first point A, the position (xb, yb, zb) of the second point B, a correction completion, and a calibration completion key selectable and a recalibration key selectable, and prompts the measurer to select either the calibration completion key or the recalibration key.

Here, in a case where the measurer thinks that it is necessary to perform the calibration again, when the measurer selects the recalibration key, the correction control part 105 receives the selection of the recalibration key and returns to the S102, and the first point measurement control part 101 measures the position of the first point A again (FIG. 4: S102).

Here, for example, in a case where the measurer changes the position of the first point A, when the measurer inputs the reference cylindrical angle α1 of the cylinder part 11*a*, the first point measurement control part 101 receives the reference cylindrical angle α1 of the cylinder part 11*a*, rotates the cylinder part 11*a* of the cylindrical rotation part 11 by the reference cylindrical angle α1, and measures the position of the first point A of the hollow 5. In this way, in a case where the calibration is repeated, it is possible to measure the position of the first point A and the position of the second point B at different positions and perform the correction process. And, when the measurer inputs the reference mirror angle β1 of the columnar part 13*a*, the first point measurement control part 101 receives the reference mirror angle β1 of the columnar part 13*a* similarly, rotates the columnar part 13*a* of the mirror rotation part 11 by the reference mirror angle β1 and measures the position of the first point A in the hollow 5. In S102, when the measurement of the position of the first point A is completed, the process is repeated up to S108.

On the other hand, in the S108, in a case where the measurer thinks that it is not necessary to perform calibration again, the measurer selects the calibration completion key, the correction control part 105 receives the selection of the calibration completion key. And a shape measurement control part 106 of the control device 15 rotates the rotation angle β of the columnar part 13*a* to a predetermined measurement angle β0, then irradiates the laser beam L while rotating the rotation angle α at each predetermined measurement angle α0, and measures a shape with the radial distance d3 from the reflection point R of the laser beam L to the irradiation point P of the laser beam L as a radius of the shape and with the reflection point R of the laser light L on the mirror 14 as the center of the shape (FIG. 4: S109).

Figure 7A:
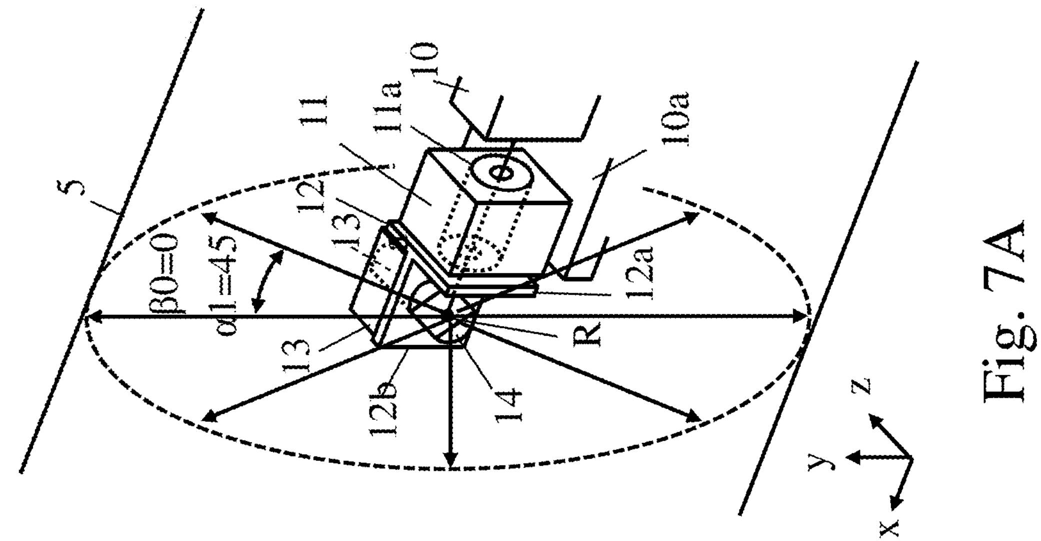
FIG. 7A is a rear side perspective view showing an example of the shape measurement when a measurement angle $\beta 0$ of the shape measurement device according to the present invention is 0 degrees.

Here, the measurement method of the shape measurement control part 106 is not particularly limited. For example, as shown in FIG. 7A, the shape measurement control part 106 rotates the rotation angle β of the columnar part 13*a* to the predetermined measurement angle β0 (for example, 0 degrees), irradiates the laser beam L while rotating the rotation angle α of the cylinder part 11*a* at each predetermined measurement angle α0 (for example, 45 degrees), and calculates the radial distance d3 for each measurement angle α0. Here, the measurement angle α0 is not particularly limited. For example, the measurement angle α0 may be 5 degrees, 10 degrees, 20 degrees, 30 degrees, 45 degrees, 60 degrees, 90 degrees, etc.

Here, the shape measurement control part 106 rotates the rotation angle α of the cylinder part 11*a* from 0 degrees to 360 degrees, and makes the laser beam L rotate one rotation from 0 degrees to 360 degrees. Then, the shape measurement control part 106 calculates the position of the irradiation point P for each measurement angle α0 with the reflection point R of the laser beam L as the center, and connects the positions of the irradiation points P for each measurement angle θ. Thus, the shape measurement control part 106 can measure the cross-sectional shape of the hollow 5 at the site.

Figure 7B:
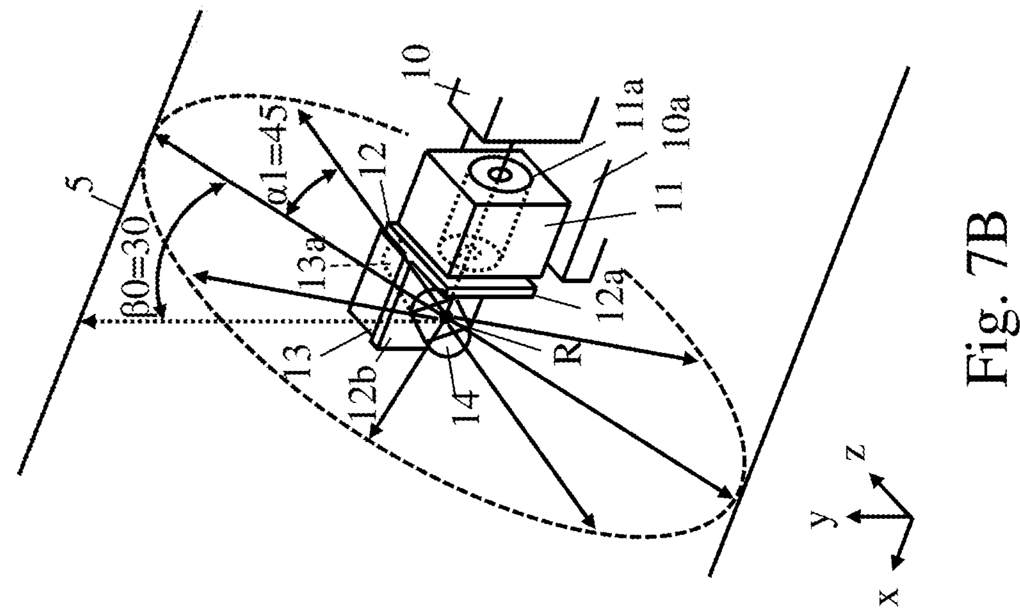
FIG. 7B is a rear side perspective view showing an example of the shape measurement when the measurement angle $\beta 0$ is 30 degrees.

As shown in FIG. 7B, the shape measurement control part 106 rotates the rotation angle β of the columnar part 13*a* to the predetermined measurement angle β0 (for example, 30 degrees), and then irradiates the laser beam L while rotating the rotation angle α of the cylinder part 11*a* by the predetermined measurement angle α0 (for example, 45 degrees), and calculates the radial distance d3 for each measurement angle α0. And, the shape measurement control part 106 calculates the position of the irradiation point P for each measurement angle α0 with the reflection point R of the laser beam L as the center, and connects the positions of the irradiation points P for each measurement angle α0. Here, by rotating the columnar part 13*a* by the predetermined measurement angle β0, it is possible to measure the cross-sectional shape in a direction inclined from the vertical direction with respect to the hollow 5. In the above description, the shape measurement control part 106 fixes the measurement angle β of the cylinder part 11*a*, rotates the rotation angle α of the columnar part 13*a*, and measures each irradiation point P. It is not particularly limited. the shape measurement control part 106 appropriately combines the measurement angle β of the columnar part 13*a* and the rotation angle α of the cylinder part 11*a*, it is possible to measure not only the hollow cross-sectional shape but also various surface shapes.

As described above, the present invention can perform the calibration work easily and can measure the shape accurately. In particular, by setting the rotation axis of the laser beam L to two axes, it is possible to measure not only the cross-sectional shape of the hollow 5 in the vertical direction but also the cross-sectional shape of the hollow 5 in a direction inclined from the vertical direction, and it is possible to widen a measurement range of the shape.

In particular, since the present invention performs the correction process by the regular and reverse rotation operation of the two axes by the rotation of the cylinder part 11*a* and the rotation of the columnar part 13*a*, so the correction is not based on an absolute position in one axis, but on a relative position in two axes. Therefore, among the three causes in the calibration work in the conventional art, it is possible to eliminate a defect of the setting of the second reference point of the second cause and a defect of the installation position of the device of the third cause, and it is possible to narrow down a cause to a defect of the rotation operation of the cylinder part 11*a* and the columnar part 13*a* of the first cause. As a result, it is possible to improve the efficiency of the calibration work and the calibration accuracy.

Further, in the conventional single-axis hollow cross-sectional shape measurement device, the calibration space is needed in four directions at each 90 degrees in the orthogonal direction of the rotation axis, but in a biaxial shape measurement device of the present invention, the calibration space is not needed in a facing direction by the regular and reverse rotation, and the calibration space is only needed in two directions, so that the calibration space can be reduced. In other words, the calibration space of the biaxial shape measurement device of the present invention is only one fourth of the calibration space of the single-axis hollow cross-sectional shape measurement device.

In the above description, the case where the reference mirror angle β1 is 0 degrees and the inversion angle β2 is 180 degrees has been described, if the inversion angle β2 is an angle line-symmetrical to the reference mirror angle β1 with respect to the laser beam L irradiated from the end part of the cylinder part 11*a* as a symmetry line, the inversion angle β2 is not particularly limited.

Figure 8A:
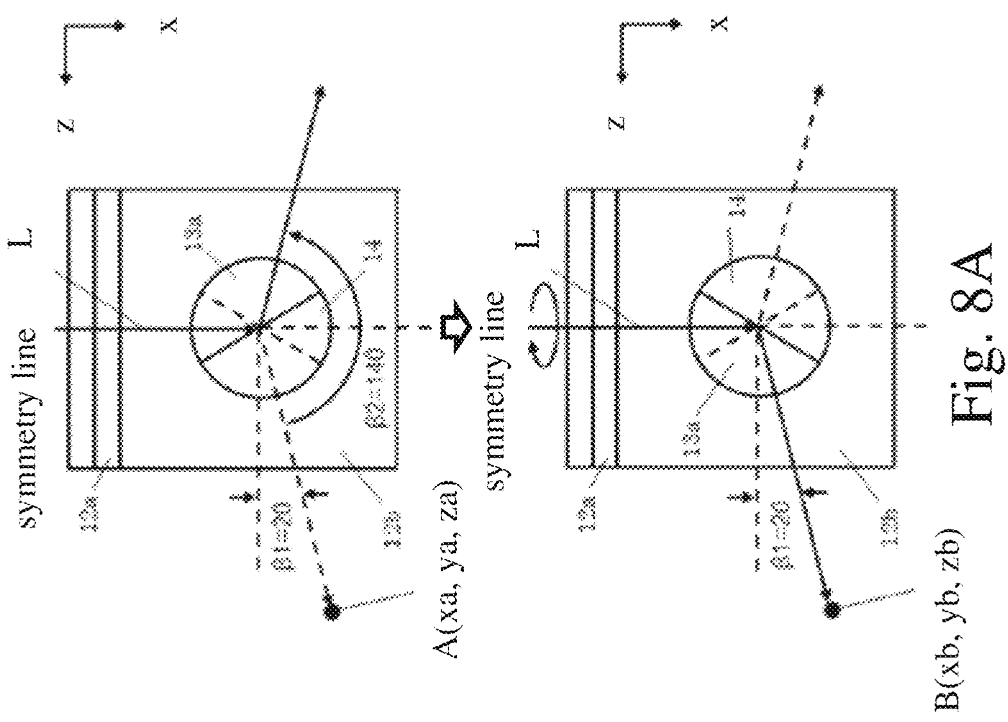
FIG. 8A is a plan view showing an example of the rotation of the columnar part and the rotation of the cylinder part when the reference mirror angle $\beta 1$ is 20 degrees and the inversion angle $\beta 2$ is 140 degrees.

For example, as shown in FIG. 8A, when the reference mirror angle 1 is 20 degrees, the inversion angle β2 is 180−20−20=140 degrees. Thus, by rotating the cylinder part 11*a* by 180 degrees, the second point B returns to the first point A.

Figure 8B:
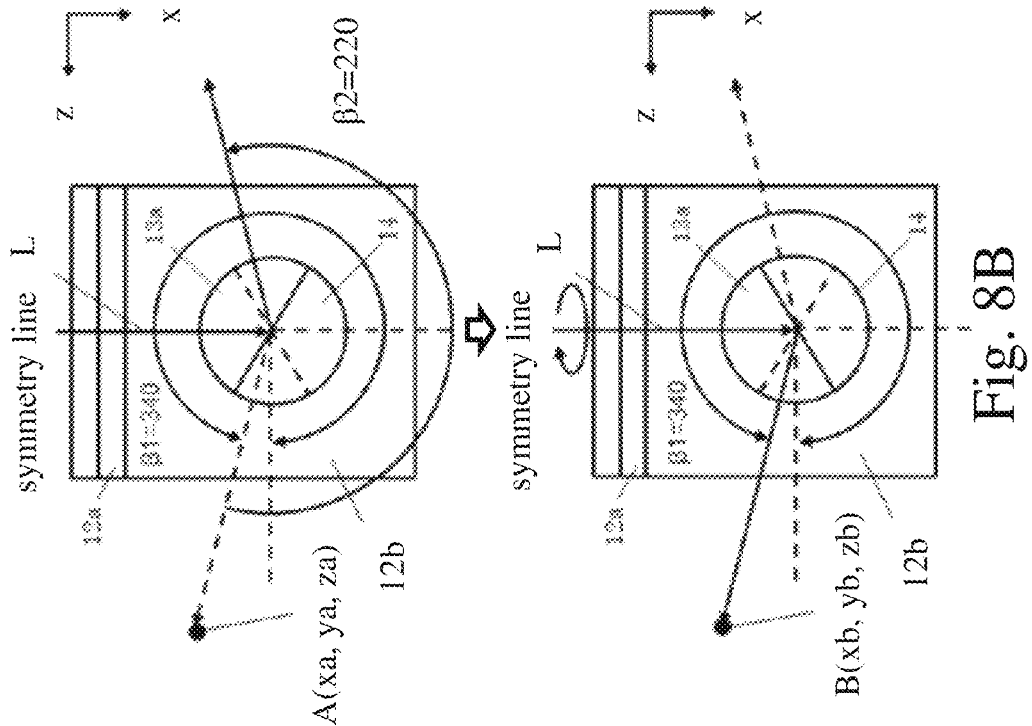
FIG. 8B is a plan view showing an example of the rotation of the columnar part and the rotation of the cylinder part when the reference mirror angle $\beta 1$ is 340 degrees and the inversion angle $\beta 2$ is 220 degrees.

As shown as shown in FIG. 8B, when the reference mirror angle β1 is 340 degrees, the inversion angle β2 is 180−(340−360)−(340−360)=220 degrees. Thus, by rotating the cylinder part 11*a* by 180 degrees, the second point B returns to the first point A. In this way, the inversion angle β2 can be appropriately determined.

Figure 9A:
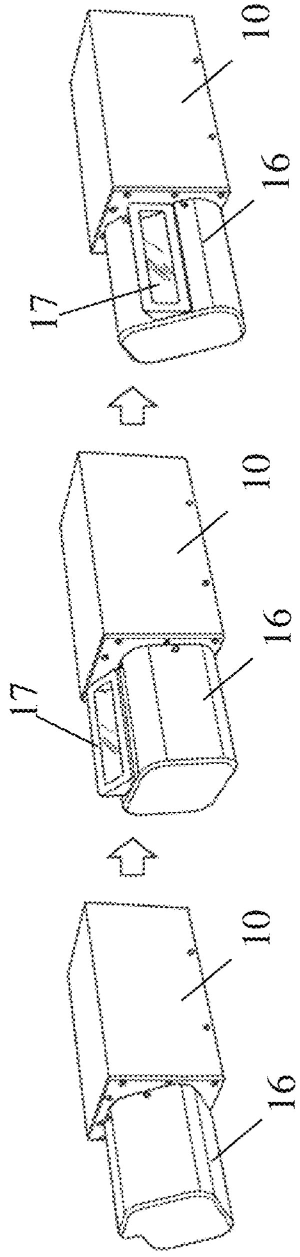
FIG. 9A is a perspective view showing an example of a rotation at a first rotation angle in the shape measurement device provided with a cover part and a transmission part.
Figure 9B:
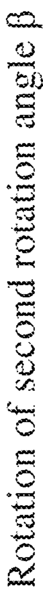
FIG. 9B is a perspective view showing an example of a rotation at a second rotation angle and an internal configuration in the shape measurement device provided with a cover part and a transmission part.
Figure 9B:
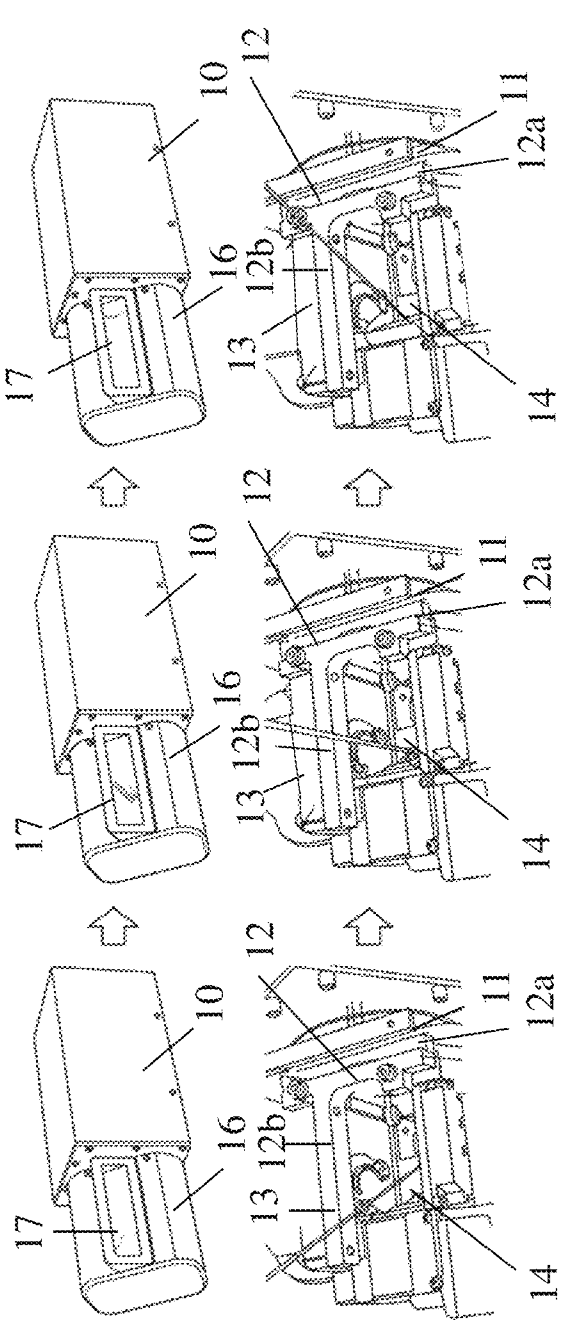

In the present invention, the holding part 12, the mirror rotation part 13, and the mirror 14 are exposed to an outside. As shown in FIG. 9, the present invention includes a cover part 16 and a transmission part 17, the cover part 16 protecting the holding part 12, the mirror rotation part 13, and the mirror 14, the transmission part 17 provided in the cover part 16, and making the laser beam L transmit, so the cover part 16 and the transmission part 17 may protect the holding part 12, the mirror rotation part 13, and the mirror 14. The transmission part 17 may be formed in an elongated shape along the laser beam L irradiated from the end part of the cylinder part 11*a* in accordance with a scanning region of the laser beam L.

In the above description, the correction control part 105 is configured to correct the rotation operation X of the cylinder part 11*a* and the rotation operation Y of the columnar part 13*a*. However, the present invention may include an adjustment mechanism for physically adjusting a first rotation angle α and a second rotation angle β separately in a main body of the shape measurement device 1. For example, by providing a first adjustment mechanism for adjusting the first rotation angle α of the cylinder part 11*a* and a second adjustment mechanism for adjusting the second rotation angle β of the columnar part 13*a*, it is possible to perform physical adjustment.

Since the present invention can achieve high accuracy, it is possible to measure not only the cross-sectional shape of the hollow of tunnel, the large underground cavity, the building, or the large cylindrical pipe, but also the cross-sectional shape of a hollow such as a small underground cavity, a small cylindrical pipe, etc., and furthermore, it is suitable for checking and inspecting these changes over time, etc.

For example, the present invention can be used for measurement of a clearance (tail clearance) between an inner peripheral surface of a tail part of a shield machine in excavation of a subway or a sewerage tunnel and an outer peripheral surface of a segment located inside the tail part. For example, the shape measurement device 1 according to the present invention is installed near the center of a tunnel, the calibration work is performed, the inner peripheral surface of the tail part of the shield machine as a first shape is first measured, the outer peripheral surface of the segment installed inside the tail part as a second shape is second measured, it is possible to measure the tail clearance by subtracting the second shape from the first shape.

Figure 10A:
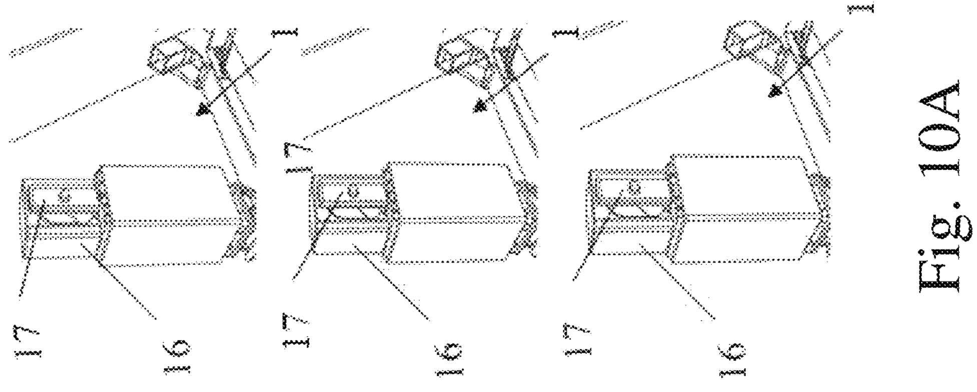
FIG. 10A is a perspective view of a device side showing an example when the shape measurement device is applied to a face of a tunnel face.
Figure 10:
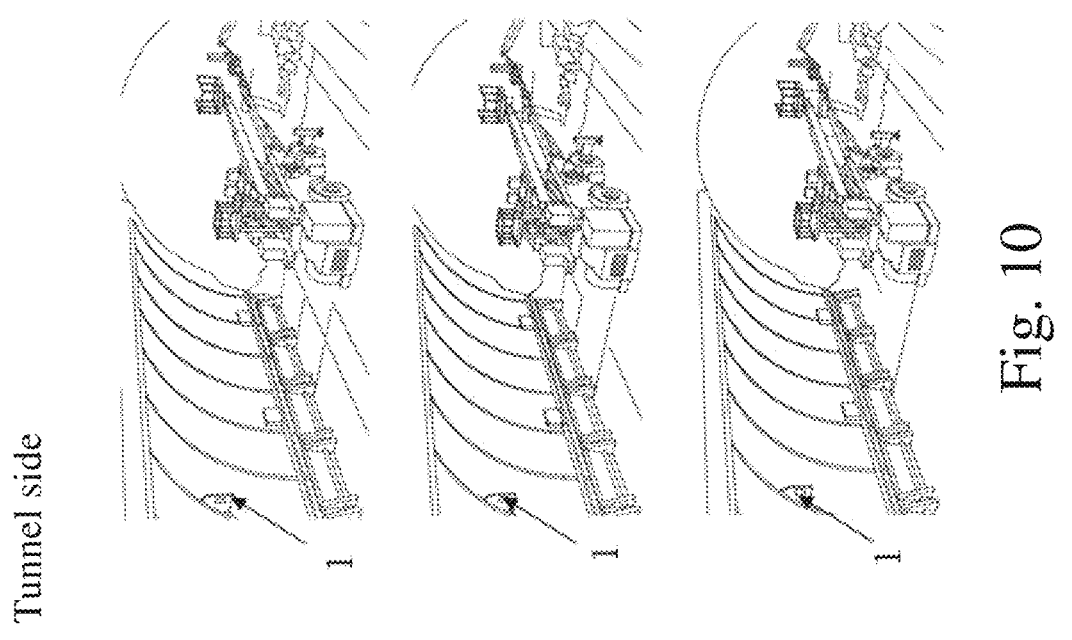

Further, in mountain tunnel construction, it is important to ensure a stability of a tunnel face, and therefore, it is necessary to periodically monitor a push-out amount of the tunnel face. The present invention can be used to measure the push-out amount of the tunnel face. For example, the shape measurement device 1 according to the present invention is installed in front of the tunnel face, the calibration work is performed, a surface of a first tunnel face is measured as a first shape, a surface of the same tunnel face is measured as a second shape after a lapse of a predetermined period, it is possible to measure the push-out amount of the tunnel face by subtracting the second shape from the first shape. Specifically, as shown in FIG. 10, by vertically standing the shape measurement device 1 provided with the cover part 16 and the transmission part 17 and scanning the laser beam L at a predetermined first rotation angle α and a predetermined second rotation angle β with respect to the tunnel face, it is possible to measure the surface of the tunnel face.

Further, the present invention may be used for measurement of a face pushing behavior or management of a finished shape of a mountain tunnel. the present invention may measure displacement of a slope or a wall surface or a three-dimensional surface shape.

Examples, Comparative Examples, Etc

The present invention will be specifically described below by way of Examples and Comparative examples, and the present invention is not limited thereby.

EXAMPLE

Figure 11A:
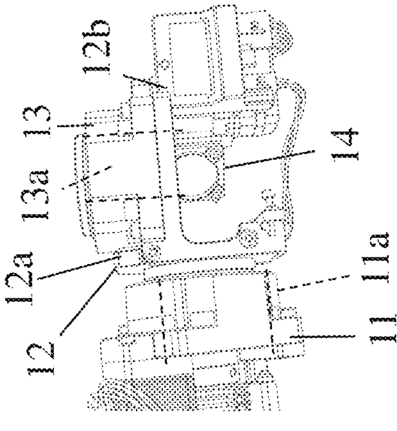
FIG. 11A is a perspective view showing an example of the rotation of a cylinder part in Example.
Figure 11A:
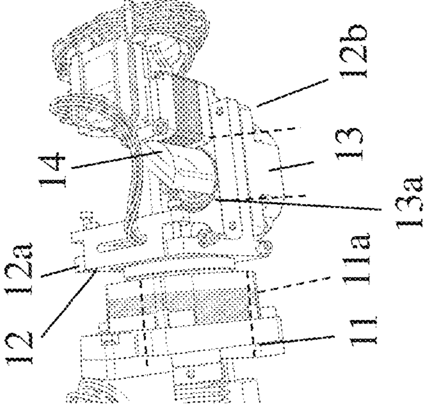
Figure 11A:
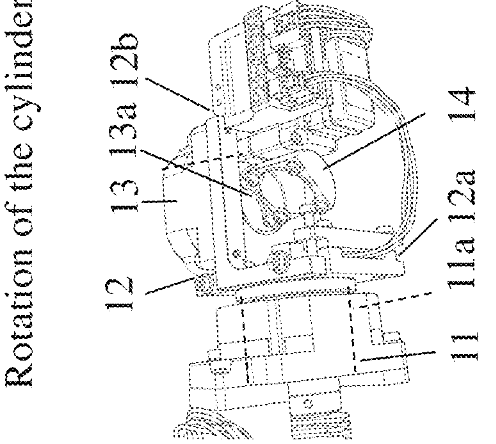
Figure 11B:
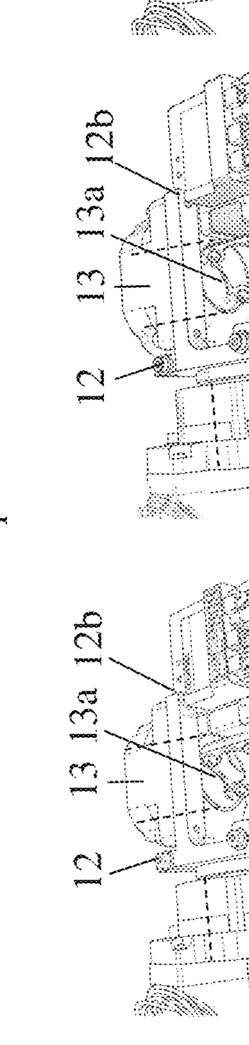
FIG. 11B is a perspective view showing an example of the rotation of a columnar part in Example.

As shown in FIGS. 1 to 7, a shape measurement device 1 according to the present invention was assembled and manufactured, and as shown in FIGS. 11A and 11B, the manufactured shape measurement device 1 was used as an Example. Here, as shown in FIG. 11A, it was confirmed that the rotation angle of the columnar part 13*a* was fixed and the cylinder part 11*a* rotated by 360 degrees. Further, as shown in FIG. 11B, it was confirmed that the rotation angle of the cylinder part 11*a* was fixed and the columnar part 13*a* rotated by 360 degrees.

<Confirmation Test of Variation in Measurement Points>

Figure 12:
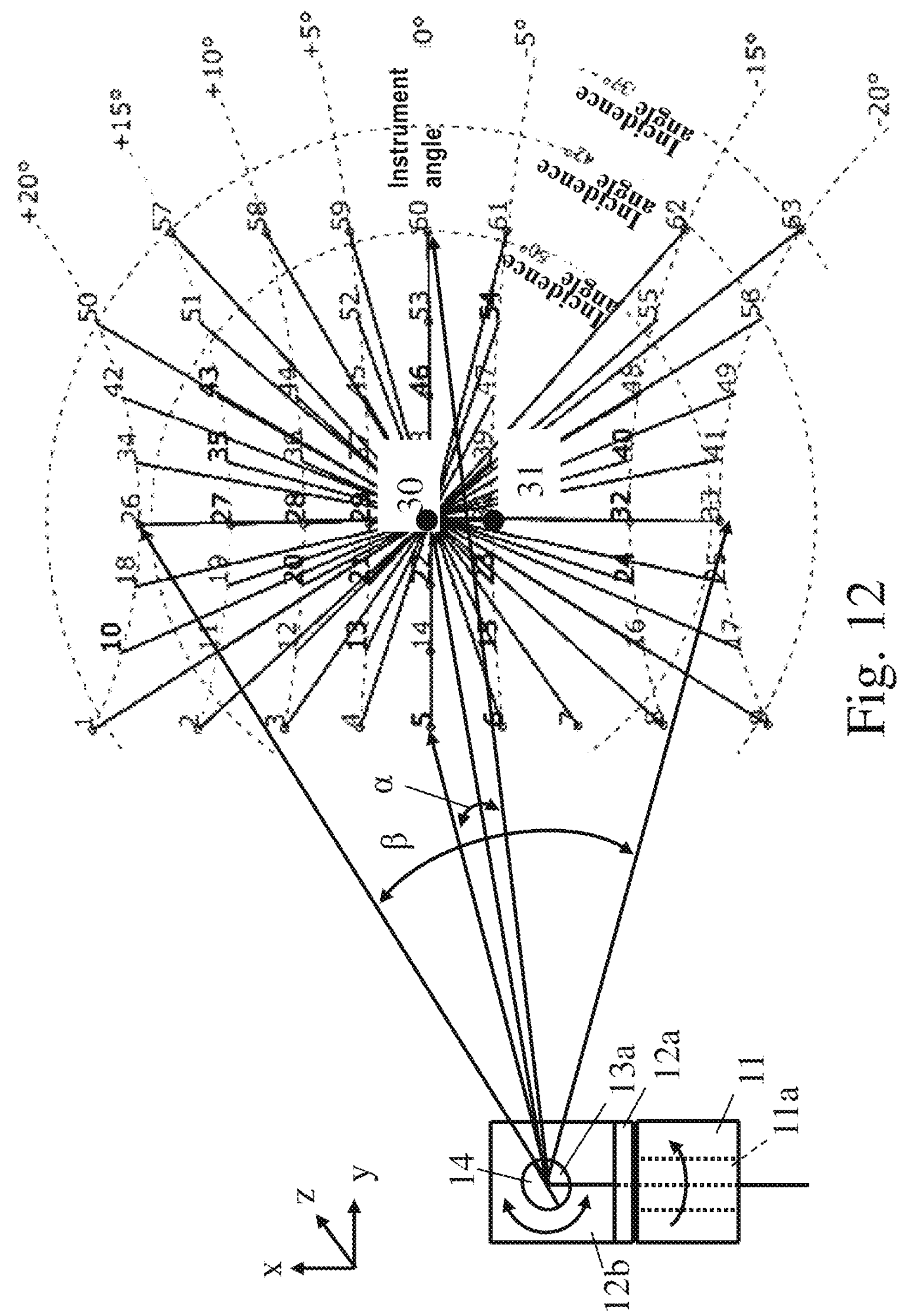
FIG. 12 is a schematic view showing an example of a confirmation test of a variation in measurement points.

As shown in FIG. 12, in a room, the shape measurement device 1 of Example was vertically installed at a position away from a wall surface by a predetermined distance (about 2000 mm), and the laser beam L was coincided with the y-axis direction. The rotation angle of the columnar part 13*a* for reflecting the laser beam L in a direction perpendicular to an irradiation direction was set to an instrument angle of 0 degrees, and a first rotation angle α of the cylinder part 11*a* and a second rotation angle β of the columnar part 13*a* were corrected. Measurement points (No. 1 to No. 63) corresponding to each first rotation angle α and each second rotation angle β were set. Next, the processes from the S101 to the S108 was performed to perform the calibration process, and then the radial distance d3 from the reflection point R of the laser beam L to the irradiation point P of the laser beam L was measured ten times, the subtracted value obtained by subtracting the smallest value from the largest value among the ten measurement points was calculated as the difference, and the variation in the measurement points was confirmed.

<Result of Confirmation Test of Variation in Measurement Points>

As shown in FIG. 13, the differences of the measurement points from No. 1 to No. 63 were all within 1.5 mm, and it was found that the variation of the measurement points was extremely small.

Comparative Example

A commercially available surveying instrument was used as a Comparative Example.

<Confirmation Test of Accuracy of Measurement Points>

Figure 14:
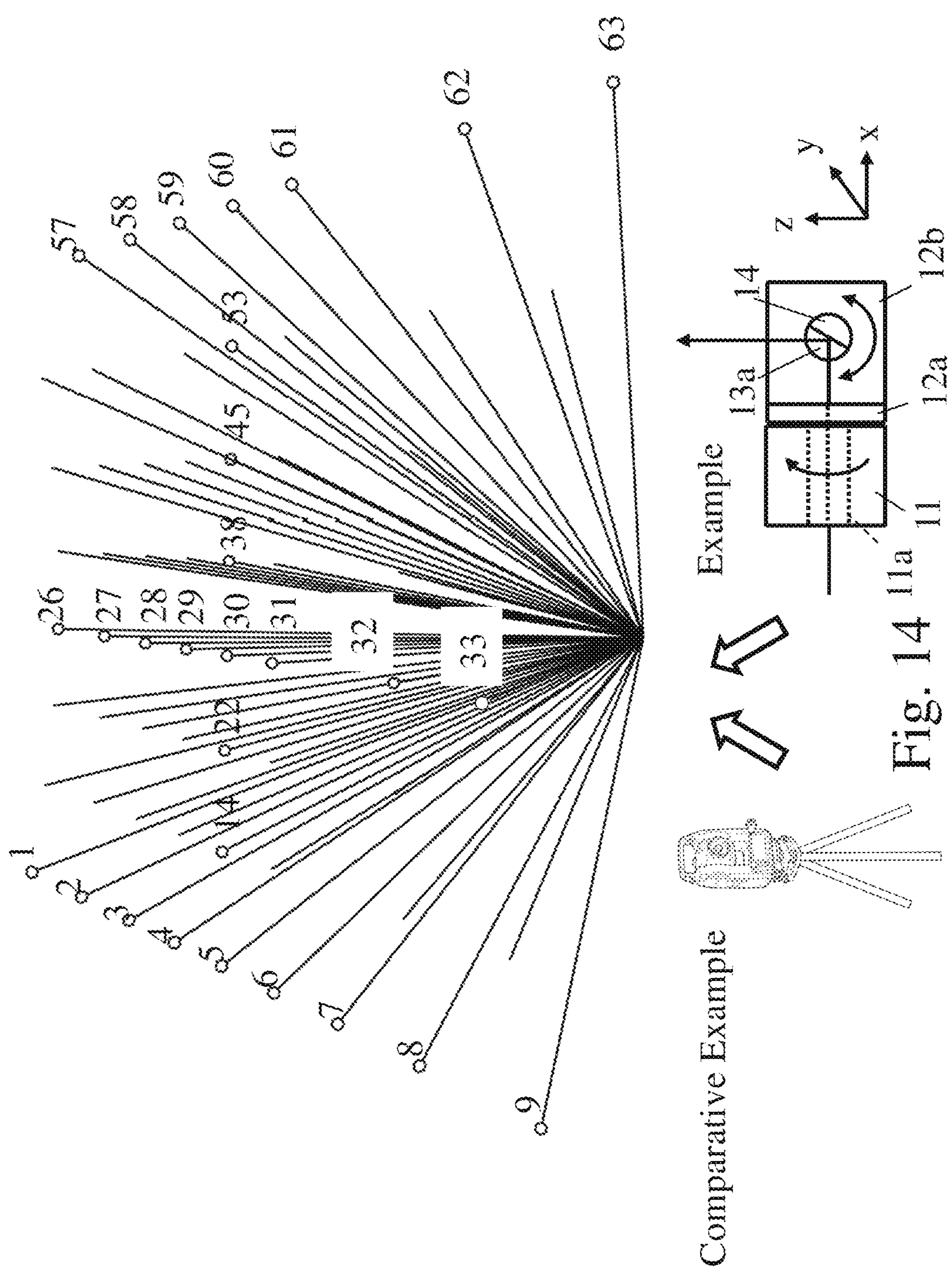
FIG. 14 is a schematic view showing an example of a confirmation test of an accuracy in measurement points.

As shown in FIG. 14, in a room, the shape measurement device 1 of Example was horizontally installed at a position away from the roof by a predetermined distance (about 2000 mm), and the laser beam L was coincided with the z-axis direction. The rotation angle of the columnar part 13*a* for reflecting the laser beam L in a direction perpendicular to an irradiation direction was set to an instrument angle of 0 degrees, and a first rotation angle α of the cylinder part 11*a* and a second rotation angle β of the columnar part 13*a* were corrected. Measurement points (No. 1 to No. 9, No. 14, No. 22, No. 26 to No. 33, No. 38, No. 46, No. 53, No. 57 to No. 63, the positions of measurement point numbers are the same as in FIG. 9) corresponding to each first rotation angle α and each second rotation angle β were set. Next, the processes from the S101 to the S108 was performed to perform the calibration process, and then by using the radial distance d3 from the reflection point R of the laser beam L to the irradiation point P of the laser beam L, the positions were measured. On the other hand, the shape measurement device 1 of Example was changed to the surveying instrument of Comparative Example, and the positions of each measurement point were measured using the surveying instrument. Then, a subtraction value obtained by subtracting the position of the measurement point of Example from the position of the measurement point of Comparative Example in the x-axis direction, the y-axis direction, and the z-axis direction were calculated as differences, and the subtraction differences between the measurement points were confirmed.

<Result of Confirmation Test of Accuracy of Measurement Points>

As shown in FIG. 15, the differences between the measurement points from No. 1 to No. 9, No. 14, No. 22, No. 26 and from No. 33, No. 38, No. 46, No. 53, No. 57 to No. 63 were all within 5.0 mm, and the measurement points of the shape measurement device 1 of Example were extremely close to the measurement points of the survey instrument used in the conventional art. It was found that the accuracy of the measurement points in the example was high.

INDUSTRIAL APPLICABILITY

As described above, the shape measurement device and the shape measuring method according to the present invention are useful in the field of measuring the shape of a tunnel, a building, or the like, for example, in the field of civil engineering, the field of surveying, the field of measurement, and the like. Those are effective as a shape measurement device and a shape measuring method capable of measuring a shape with high accuracy in spite of a simple configuration.

REFERENCE NUMERALS LIST

1 SHAPE MEASUREMENT DEVICE
10 LASER RANGE FINDER PART
11 CYLINDRICAL ROTATION PART
12 HOLDING Part
13 MIRROR ROTATION PART
14 MIRROR
15 CONTROL DEVICE
101 FIRST POINT MEASUREMENT CONTROL PART
102 FIRST ROTATION CONTROL PART
103 SECOND ROTATION CONTROL PART
104 SECOND POINT MEASUREMENT CONTROL PART
105 CORRECTION CONTROL PART
106 SHAPE MEASUREMENT CONTROL PART

What is claimed is:

1. A shape measurement device comprising:

a laser range finder part being fixed to a flat table and being capable of measuring a distance from a starting point of a laser beam to an irradiation point irradiated by the laser beam;

a cylindrical rotation part being installed at an end part of the flat table, and making a rotational axis of a rotatable cylinder part coincide with the laser beam from the laser range finder part;

a holding part having a first surface and a second surface, the first surface having a passage hole through which the laser beam passes and fixed to an end part of the cylinder part of a cylindrical rotation part irradiating the laser beam, and the second surface having a cylindrical hole and being provided in a direction perpendicular to the first surface;

a mirror rotation part being fixed to the second surface, and rotatably attaching an end part of a columnar part to the cylindrical hole in a state where a rotation axis of the columnar part coincides with the laser beam from the laser range finder part;

a mirror being fixed to an end part of the columnar part, disposing a reflection surface on an extension line of the rotation axis of the columnar part, and reflecting the laser beam from the laser range finder part;

a first point measurement control part rotating the cylinder part to a predetermined reference cylindrical angle, rotating the columnar part to a predetermined reference mirror angle, making the laser beam irradiate, and measuring a position of a predetermined first point in a hollow from a reflection point of the laser beam on the mirror;

a first rotation control part rotating the cylinder part from the reference cylindrical angle to 180 degrees;

a second rotation control part rotating the columnar part from the reference mirror angle to an inversion angle that is line-symmetric with respect to the laser beam irradiated from an end part of the cylinder part;

a second point measurement control part making the laser beam irradiate after the cylinder part is rotated by 180 degrees, and the columnar part is rotated by the inversion angle, and measuring a position of a predetermined second point in the hollow from the reflection point of the laser beam on the mirror; and a correction control part correcting a rotation operation of the cylinder part from the reference cylindrical angle to 180 degrees, and correcting a rotation operation of the columnar part from the reference mirror angle to the inversion angle so that the position of the second point coincides with the position of the first point.

2. The shape measurement device according to claim 1, further comprising:

a shape measurement control part rotating the rotation angle of the columnar part to a predetermined measurement angle, irradiating the laser beam while rotating the rotation angle at each predetermined measurement angle, and measuring a shape with a radial distance from the reflection point of the laser beam on the mirror to the irradiation point of the laser beam as a radius of the shape and with the reflection point of the laser light on the mirror as the center of the shape.

3. The shape measurement device according to claim 1, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the first point measurement control part rotates the cylinder part to the predetermined reference cylindrical angle, coincides the laser beam with the y-axis direction, rotates the columnar part to the predetermined reference mirror angle, coincides the laser beam with the z-axis direction, irradiates the laser beam from the laser range finder part, measures a measurement distance, calculates a radius distance d3 obtained by subtracting a fixed distance from a starting point of the laser beam to a reflection point of the mirror from the measurement distance, and calculates a position (xa, ya, za) of the first point using the reference cylindrical angle $\alpha 1$, the reference mirror angle $\beta 1$ and equations (1) to (4), $$y = d3 \times \cos\alpha \quad (1)$$

$$z = d3 \times \sin\alpha \quad (2)$$

$$y = d3 \times \cos\beta \quad (3)$$

$$x = d3 \times \sin\beta \quad (4)$$

wherein the second point measurement control part irradiates the laser beam from the laser range finder part, measures the measurement distance, calculates the radius distance d3, and calculates a position (xb, yb, zb) of the second point B using calibration cylindrical angle $\alpha 2$, calibration mirror angle $\beta 2$ and the equations (1)-(4), and wherein the correction control part corrects so that the position (xb, yb, zb) of the second point B coincides with the position (xa, ya, za) of the first point A.

4. The shape measurement device according to claim 1, wherein the correction control part calculates a difference in the rotation direction of the cylinder part between the position of the second point and the position of the first point, and a difference in the rotation direction of the columnar part, and determines whether or not the difference in the rotation direction of the cylinder part is within a predetermined first threshold and whether or not the difference in the rotation direction of the columnar part is within a predetermined second threshold, wherein, when the difference in the rotation direction of the cylinder part is within the first threshold, and the difference in the rotation direction of the columnar part is within the second threshold, the correction control part does not execute a correction process, wherein, when the difference in the rotation direction of the cylinder part is over the first threshold, the correction control part corrects the rotation operation of the cylinder part, wherein, when the difference in the rotation direction of the columnar part is over the second threshold, the correction control part corrects the rotation operation of the columnar part.

5. The shape measurement device according to claim 1, wherein the correction control part calculates a difference in the rotation direction of the cylinder part between the position of the second point and the position of the first point, and a difference in the rotation direction of the columnar part, wherein the correction control part calculates a correction value of the rotation operation of the cylinder part by using the radial distance from the reflection point of the laser beam on the mirror to the irradiation point of the laser beam in the measurement of the position of the first point or the second point and the difference in the rotation direction of the cylinder part, wherein the correction control part calculates a correction value of the rotation operation of the columnar part by using the radial distance and the difference in the rotation direction of the columnar part, wherein the correction control part corrects the rotation operation of the cylinder part and the rotation operation of the columnar part.

6. The shape measurement device according to claim 1, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the correction control part calculates a difference (dx=xb−xa) in the x-axis direction and a difference (dy=yb−ya) in the y-axis direction between the position (xb, yb, zb) of the second point and the position (xa, ya, za) of the first point, wherein the correction control part calculates an angle difference $d\alpha$ in the y-axis direction using equation (5) by using the radial distance d3 from the reflection point of the laser beam on the mirror to the irradiation point of the laser beam in the measurement of the position of the first point and the difference dy in the y-axis direction, $$d\alpha = \tan^{-1}(dy / d3) \quad (5)$$

wherein the correction control part calculates a correction value ay of the rotation operation of the cylinder part by using the angle difference $d\alpha$ in equation (6), $$ay = (180 - d\alpha) / 180 \quad (6)$$

wherein the correction control part corrects the rotation operation of the cylinder part by multiplying the rotation operation of the cylinder part by the correction value ay.

7. The shape measurement device according to claim 1, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the correction control part calculates a difference (dx=xb−xa) in the x-axis direction and a difference (dy=yb−ya) in the y-axis direction between the position (xb, yb, zb) of the second point and the position (xa, ya, za) of the first point, wherein the correction control part calculates an angle difference dβ in the x-axis direction using equation (7) by using the radial distance d3 from the reflection point of the laser beam on the mirror to the irradiation point of the laser beam in the measurement of the position of the first point and the difference dx in the x-axis direction, $$d\beta = \tan^{-1}(dx/d3) \quad (7)$$

wherein the correction control part calculates a correction value ax for the rotation operation of the columnar part by using the reference mirror angle β1, the inversion angle β2, and the angle difference dβ in equation (8), $$ax = (\beta 2 - \beta 1 - d\beta)/(\beta 2 - \beta 1) \quad (8)$$

wherein the correction control part corrects the rotation operation of the columnar part by multiplying the rotation operation of the columnar part by the correction value ax.

8. The shape measurement device according to claim 6, wherein the correction control part calculates an angle difference dβ in the x-axis direction using equation (7) by using the radial distance d3 from the reflection point of the laser beam on the mirror to the irradiation point of the laser beam in the measurement of the position of the first point and the difference dx in the x-axis direction, $$d\beta = \tan^{-1}(dx/d3) \quad (7)$$

wherein the correction control part calculates a correction value ax for the rotation operation of the columnar part by using the reference mirror angle β1, the inversion angle β2, and the angle difference dβ in equation (8), $$ax = (\beta 2 - \beta 1 - d\beta)/(\beta 2 - \beta 1) \quad (8)$$

wherein the correction control part corrects the rotation operation of the columnar part by multiplying the rotation operation of the columnar part by the correction value ax.

9. The shape measurement device according to claim 7, wherein, when the reference mirror angle β1 is 0 degrees and the inversion angle β2 is 180 degrees, the correction control part calculates a correction value ax of the rotation operation of the columnar part by using the angle difference dβ in equation (9), $$ax = (180 - d\beta)/180. \quad (9)$$

10. A shape measurement method of a shape measurement device, wherein the shape measurement device comprises:

a laser range finder part being fixed to a flat table and being capable of measuring a distance from a starting point of a laser beam to an irradiation point irradiated by the laser beam;

a cylindrical rotation part being installed at an end part of the flat table, and making a rotational axis of a rotatable cylinder part coincide with the laser beam from the laser range finder part;

a holding part having a first surface and a second surface, the first surface having a passage hole through which the laser beam passes and fixed to an end part of the cylinder part of a cylindrical rotation part irradiating the laser beam, and the second surface having a cylindrical hole and being provided in a direction perpendicular to the first surface;

a mirror rotation part being fixed to the second surface, and rotatably attaching an end part of a columnar part to the cylindrical hole in a state where a rotation axis of the columnar part coincides with the laser beam from the laser range finder part; and a mirror being fixed to an end part of the columnar part, disposing a reflection surface on an extension line of the rotation axis of the columnar part, and reflecting the laser beam from the laser range finder part, wherein the shape measurement method comprises:

a first point measurement control step for rotating the cylinder part to a predetermined reference cylindrical angle, rotating the columnar part to a predetermined reference mirror angle, making the laser beam irradiate, and measuring a position of a predetermined first point in a hollow from a reflection point of the laser beam on the mirror;

a first rotation control step for rotating the cylinder part from the reference cylindrical angle to 180 degrees;

a second rotation control step for rotating the columnar part from the reference mirror angle to an inversion angle that is line-symmetric with respect to the laser beam irradiated from an end part of the cylinder part;

a second point measurement control step for making the laser beam irradiate after the cylinder part is rotated by 180 degrees, and the columnar part is rotated by the inversion angle, and measuring a position of a predetermined second point in the hollow from the reflection point of the laser beam on the mirror; and a correction control step for correcting a rotation operation of the cylinder part from the reference cylindrical angle to 180 degrees, and correcting a rotation operation of the columnar part from the reference mirror angle to the inversion angle so that the position of the second point coincides with the position of the first point.

11. The shape measurement device according to claim 1, further comprising:

a cover part protecting the holding part, the mirror rotation part, and the mirror; and a transmission part provided in the cover part, and making the laser beam transmit, wherein the cover part and the transmission part protect the holding part, the mirror rotation part, and the mirror.

12. The shape measurement method according to claim 10, further comprising:

a shape measurement control step for rotating the rotation angle of the columnar part to a predetermined measurement angle, irradiating the laser beam while rotating the rotation angle at each predetermined measurement angle, and measuring a shape with a radial distance from the reflection point of the laser beam on the mirror to the irradiation point of the laser beam as a radius of the shape and with the reflection point of the laser beam on the mirror as the center of the shape.

13. The shape measurement method according to claim 10, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the first point measurement control step rotates the cylinder part to a predetermined reference cylindrical angle, coincides the laser beam with the y-axis direction, rotates the columnar part to a predetermined reference mirror angle, coincides the laser beam with the z-axis direction, irradiates the laser beam from the laser range finder part, measures a measurement distance, calculates a radial distance d3 obtained by subtracting a fixed distance from a starting point of the laser beam to a reflection point of the mirror from the measurement distance, and calculates a position (xa, ya, za) of the first point using the reference cylindrical angle $\alpha 1$, the reference mirror angle $\beta 1$ and equations (1) to (4), $$y = d3 \times \cos\alpha \tag{1}$$

$$z = d3 \times \sin\alpha \tag{2}$$

$$y = d3 \times \cos\beta \tag{3}$$

$$x = d3 \times \sin\beta \tag{4}$$

wherein the second point measurement control step irradiates the laser beam from the laser range finder part, measures the measurement distance, calculates the radial distance d3, and calculates a position (xb, yb, zb) of the second point B using calibration cylindrical angle $\alpha 2$, calibration mirror angle $\beta 2$ and the equations (1)-(4), and wherein the correction control step corrects so that the position (xb, yb, zb) of the second point B coincides with the position (xa, ya, za) of the first point A.

14. The shape measurement method according to claim 10, wherein the correction control step calculates a difference in the rotation direction of the cylinder part between the position of the second point and the position of the first point, and a difference in the rotation direction of the columnar part, and determines whether or not the difference in the rotation direction of the cylinder part is within a predetermined first threshold and whether or not the difference in the rotation direction of the columnar part is within a predetermined second threshold, wherein, when the difference in the rotation direction of the cylinder part is within the first threshold and the difference in the rotation direction of the columnar part is within the second threshold, the correction control step does not execute a correction process, wherein, when the difference in the rotation direction of the cylinder part is over the first threshold, the correction control step corrects the rotation operation of the cylinder part, wherein, when the difference in the rotation direction of the columnar part is over the second threshold, the correction control step corrects the rotation operation of the columnar part.

15. The shape measurement method according to claim 10, wherein the correction control step calculates a difference in the rotation direction of the cylinder part between the position of the second point and the position of the first point, and a difference in the rotation direction of the columnar part, wherein the correction control step calculates a correction value of the rotation operation of the cylinder part by using the radial distance from the reflection point of the laser beam on the mirror to the irradiation point of the laser beam in the measurement of the position of the first point or the second point and the difference in the rotation direction of the cylinder part, wherein the correction control step calculates a correction value of the rotation operation of the columnar part by using the radial distance and the difference in the rotation direction of the columnar part, wherein the correction control step corrects the rotation operation of the cylinder part and the rotation operation of the columnar part.

16. The shape measurement method according to claim 10, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the correction control step calculates a difference (dx=xb−xa) in the x-axis direction and a difference (dy=yb−ya) in the y-axis direction between the position (xb, yb, zb) of the second point and the position (xa, ya, za) of the first point, wherein the correction control step calculates an angle difference $d\alpha$ in the y-axis direction using equation (5) by using the radial distance d3 from the reflection point of the laser beam on the mirror to the irradiation point of the laser beam in the measurement of the position of the first point and the difference dy in the y-axis direction, $$d\alpha = \tan - 1(dy/d3) \tag{5}$$

wherein the correction control step calculates a correction value ay of the rotation operation of the cylinder part by using the angle difference $d\alpha$ in equation (6), $$ay = (180 - d\alpha)/180 \quad (6)$$

wherein the correction control step corrects the rotation operation of the cylinder part by multiplying the rotation operation of the cylinder part by the correction value ay.

17. The shape measurement method according to claim 10, wherein a traveling direction of the laser beam from the starting point of the laser range finder part is defined as an x-axis direction, an upper direction perpendicular to the traveling direction of the laser beam is defined as a y-axis direction, and a right direction perpendicular to the traveling direction of the laser beam is defined as a z-axis direction, wherein the correction control step calculates a difference (dx=xb−xa) in the x-axis direction and a difference (dy=yb−ya) in the y-axis direction between the position (xb, yb, zb) of the second point and the position (xa, ya, za) of the first point, wherein the correction control step calculates an angle difference dβ in the x-axis direction using equation (7) by using the radial distance d3 from the reflection point of the laser beam on the mirror to the irradiation point of the laser beam in the measurement of the position of the first point and the difference dx in the x-axis direction, $$d\beta = \tan - 1(dx/d3) \quad (7)$$

wherein the correction control step calculates a correction value ax for the rotation operation of the columnar part by using the reference mirror angle β1, the inversion angle β2, and the angle difference dβ by the following equation (8), $$ax = (\beta 2 - \beta 1 - d\beta)/(\beta 2 - \beta 1) \quad (8)$$

wherein the correction control step corrects the rotation operation of the columnar part by multiplying the rotation operation of the columnar part by the correction value ax.

18. The shape measurement method according to claim 16, wherein the correction control step calculates an angle difference dβ in the x-axis direction using equation (7) by using the radial distance d3 from the reflection point of the laser beam on the mirror to the irradiation point of the laser beam in the measurement of the position of the first point and the difference dx in the x-axis direction, $$d\beta = \tan - 1(dx/d3) \quad (7)$$

wherein the correction control step calculates a correction value ax for the rotation operation of the columnar part by using the reference mirror angle β1, the inversion angle β2, and the angle difference dβ in equation (8), $$ax = (\beta 2 - \beta 1 - d\beta)/(\beta 2 - \beta 1) \quad (8)$$

wherein the correction control step corrects the rotation operation of the columnar part by multiplying the rotation operation of the columnar part by the correction value ax.

19. The shape measurement method according to claim 17, wherein, when the reference mirror angle β1 is 0 degrees and the inversion angle β2 is 180 degrees, the correction control step calculates a correction value ax of the rotation operation of the columnar part by using the angle difference dβ in equation (9).

$$ax = (180 - d\beta)/180 \quad (9)$$

20. The shape measurement method according to claim 10, the shape measurement device further comprising:

a cover part protecting the holding part, the mirror rotation part, and the mirror; and a transmission part provided in the cover part, and making the laser beam transmit, wherein the cover part and the transmission part protect the holding part, the mirror rotation part, and the mirror.

* * * * *